(12) United States Patent
Standaert et al.

(10) Patent No.: US 12,146,036 B2
(45) Date of Patent: Nov. 19, 2024

(54) POLYPROPYLENE-BASED COMPOSITIONS WITH TRANSPARENCY AND ELONGATIONAL PROPERTIES

(71) Applicant: TOTALENERGIES ONETECH, Courbevoie (FR)

(72) Inventors: Alain Standaert, Seneffe (BE); Maryline Costa, Seneffe (BE)

(73) Assignee: TOTALENERGIES ONETECH, Courbevoie (FR)

( * ) Notice: Subject to any disclaimer, the term of this patent is extended or adjusted under 35 U.S.C. 154(b) by 0 days.

(21) Appl. No.: 18/688,443

(22) PCT Filed: Sep. 2, 2022

(86) PCT No.: PCT/EP2022/074533
§ 371 (c)(1),
(2) Date: Mar. 1, 2024

(87) PCT Pub. No.: WO2023/036716
PCT Pub. Date: Mar. 16, 2023

(65) Prior Publication Data
US 2024/0327581 A1    Oct. 3, 2024

(30) Foreign Application Priority Data
Sep. 9, 2021   (EP) .................................... 21195855

(51) Int. Cl.
*C08K 5/1575* (2006.01)
*C08J 3/00* (2006.01)
(Continued)

(52) U.S. Cl.
CPC .............. *C08J 3/201* (2013.01); *C08J 3/005* (2013.01); *C08K 5/14* (2013.01); *C08K 5/1575* (2013.01);
(Continued)

(58) Field of Classification Search
None
See application file for complete search history.

(56) References Cited

U.S. PATENT DOCUMENTS

2015/0045522 A1* 2/2015 Reichelt ................ C08F 210/06
526/348.5
2018/0201771 A1* 7/2018 Lodefier .................. C08J 3/005

FOREIGN PATENT DOCUMENTS

EP       2386603         11/2011
WO   WO 2019/224129     11/2019
(Continued)

OTHER PUBLICATIONS

PCT International Search Report and Written Opinion issued in International Application No. PCT/EP2022/075433, dated Dec. 1, 2022.

(Continued)

*Primary Examiner* — Peter A Salamon
(74) *Attorney, Agent, or Firm* — NORTON ROSE FULBRIGHT US LLP (57) ABSTRACT

The disclosure provides a process to produce a polypropylene composition remarkable in that it comprises providing from 30 to 75 wt. % of a component A based on the total weight of the composition, the component A being one or more propylene homopolymer resins; providing from 25 to 70 wt. % of a component B based on the total weight of the composition, the component B being one or more random propylene copolymer resins comprising propylene and one or more comonomers selected from ethylene and C4-C20 alpha-olefin, wherein the content of the comonomers is at least 5.0 wt. % based on the total weight of the component B; melt-blending the components to form the composition having a comonomer content ranging from 2.5 to 4.5 wt. % based on the total weight of the composition. The disclosure (Continued)

also relates to such a composition and an article made from said composition.

15 Claims, 2 Drawing Sheets

(51) Int. Cl.
      *C08J 3/20*       (2006.01)
      *C08K 5/14*       (2006.01)
      *C08L 23/12*     (2006.01)
      *C08L 23/14*     (2006.01)

(52) U.S. Cl.
      CPC ............... *C08L 23/12* (2013.01); *C08L 23/14* (2013.01); *C08J 2323/12* (2013.01); *C08J 2323/14* (2013.01); *C08L 2205/025* (2013.01); *C08L 2207/20* (2013.01)

(56) References Cited

FOREIGN PATENT DOCUMENTS

WO    WO 2020/104145    5/2020
WO    WO-2020104145 A1 *   5/2020  ............... C08J 5/18

OTHER PUBLICATIONS

PCT Notification of Transmittal of the International Preliminary Report on Patentability (PCT Rule 71.1) issued in International Application No. PCT/EP2022/075433, dated Aug. 8, 2023.

\* cited by examiner

POLYPROPYLENE-BASED COMPOSITIONS WITH TRANSPARENCY AND ELONGATIONAL PROPERTIES

CROSS-REFERENCE TO RELATED APPLICATIONS

This application is a national phase application under 35 U.S.C. § 371 of International Application No. PCT/EP2022/074533, filed Sep. 2, 2022, which claims priority to European Patent Application No. 21195855.8, filed Sep. 9, 2021, each of which applications are incorporated by reference herein in their entirety.

TECHNICAL FIELD

The disclosure is about polypropylene-based compositions comprising one or more propylene homopolymer resins and/or mini-random propylene copolymer resins, the use of such compositions and the process of production of the said compositions.

TECHNICAL BACKGROUND

Today, current polypropylene applications are using very specific polymers—homopolymer, random or heterophasic copolymers—depending on the targeted performances. For example, if stiffness is targeted, polypropylene (PP) homopolymer resins will be used, with a viscosity adapted to the type of processing (injection or extrusion); if transparency and flexibility are the key properties, random copolymers must be selected. Finally, for impact resistance, a PP heterophasic copolymer is the best choice. Such selection is possible because the virgin materials are existing and available. Roughly, the polypropylene world production is composed of 60% of homopolymer, 30% of heterophasic copolymers and only 10% of random copolymers. Homo- and heterophasic polypropylene copolymers are thus quite abundant while random products are less.

Recycling plastics became mandatory but the requirements on their global performances did not change. Each application keeps the same criteria with recycled plastics as with virgin materials.

US 2015/045522 A1 relates to a polypropylene composition comprising comonomer units derived from ethylene in an amount of from 1.5 wt % to 35 wt %, and from at least one C5-12 alpha-olefin in an amount of from 1.0 mol % to 3.0 mol %, wherein the polypropylene composition has an amount of xylene solubles XS of at least 40 wt %, and the xylene solubles have an amount of ethylene-derived comonomer units of from 4.0 wt % to 70 wt %.

EP 2 386 603 A1 relates to a propylene copolymer composition (P) comprising at least 2.5 wt.-% of units derivable from C 5 to C 12 ±-olefins, at least 20.0 wt-%. of a crystalline fraction having a lamella thickness of more than 5.70 nm, and at least 10.0 wt-%. of a crystalline fraction having a lamella thickness of below than 3.0 nm, said crystalline fractions are determined by the stepwise isothermal segregation technique (SIST).

US2018/201771 A1 relates to a polypropylene composition for thermoforming comprising: from 50% by weight to at most 90% by weight of a polypropylene A, wherein polypropylene A is a polypropylene random copolymer, based on the total weight of the polypropylene composition; and from 10% by weight to at most 50% by weight of a polypropylene B, wherein polypropylene B is a polypropylene homopolymer, based on the total weight of the polypropylene composition; wherein the melt flow index of polypropylene B is at most 1.0 g/10 min, as measured according to the method of standard ISO 1133, condition M, at 230° C. and under a load of 2.16 kg; and wherein the ratio of the melt flow index of polypropylene A to the melt flow index of polypropylene B is at least 80.

WO 2020/104145 A1 relates to polypropylene compositions combining high impact strength with good haze and additionally showing good stress whitening resistance.

WO 2019/224129 A1 relates to a process to produce a polypropylene-based composition comprising post-consumer resin (PCR) characterised in that it comprises the steps of providing a component A being a polypropylene post-consumer resin (PCR-PP) having an MI2 ranging from 7 to 70 g/10 min, wherein component A is a blend of recycled polypropylene and recycled polyethylene, wherein the content of the recycled polyethylene is ranging from 3 to 20 wt % relative to the total weight of component A; providing a component B being a polypropylene resin having an MI2 ranging from 0.1 to 10.0 g/10 min as determined according to ISO 1133 conditions M, at a temperature of 230° C. and under a load of 2.16 kg; and melt-blending the components to form a polypropylene-based composition wherein the content of component A in the polypropylene-based composition is ranging from 35 to 80 wt % as based on the total weight of the polypropylene-based composition. The invention is also related to the polypropylene-based composition obtained by said process and to the articles produced from said polypropylene-based composition.

The current recycling technologies allow for separating the polymers by type (PP) from other polymers such as polyethylene (PE) and by nature (homopolymer resins from copolymer resins). However, they are not able, at a reasonable cost, to guarantee a 100%-purity. Even if a severe selection is made right from the beginning of the recycling process, in the end, the isolated material could still be slightly contaminated with polymers of different types and/or nature. These contaminations could negatively affect the polymer properties. On top, if a polymer is not naturally very abundant, such as random polypropylene, it will be difficult to find sustained specific sources of it for an effective recycling process and, for cost reasons, it will be mixed with the biggest volumes of its closest parents. This means that recycled polypropylene random copolymer resins are currently poorly available while there are many applications specifically requiring such polymers. It seems thus impossible to target these applications because of a lack of recycled polypropylene resins with the right requirements.

SUMMARY

Surprisingly, it has been found that the performances of polypropylene random copolymer resins can be reached by formulating (recycled) homopolymer materials. Using specific additives and formulations, a compound based on a high content of polypropylene (recycled) homopolymer resins and/or mini random propylene copolymer resins (i.e., with a comonomer content of at most 1.0 wt. %) can be used in various applications with performances similar to the ones obtained using virgin random propylene copolymer resins, such as virgin random propylene copolymer resins having a comonomer content of about 3 to 4 wt. %.

The disclosure aims to provide a polypropylene composition based on propylene homopolymer and/or random propylene comonomer that have a low content of comonomer, wherein the polypropylene composition shows an improved balance of properties such as mechanical and elongational properties, and optionally optical properties such as transparency. The disclosure aims to provide a process to produce a polypropylene composition based on propylene homopolymer having a balance of properties comparable to the one of a random propylene copolymer.

According to a first aspect, the disclosure provides a process to produce a polypropylene composition remarkable in that it comprises the steps of:

providing from 30 to 75 wt. % of a component A based on the total weight of the polypropylene composition, wherein the component A is selected from one or more propylene homopolymer resins, one or more random propylene copolymer resins comprising propylene and one or more comonomers selected from ethylene and $C_4$-$C_{20}$ alpha-olefin; wherein the content of the one or more comonomers is at most 1.0 wt. % based on the total weight of the random propylene copolymer resins, and any mixture thereof; and wherein the component A has a melt index ($MI_2$) ranging from 2.0 to 100.0 g/10 min as determined according to ISO 1133-1:2011 at a temperature of 230° C. and under a load of 2.16 kg;

providing from 25 to 70 wt. % of a component B based on the total weight of the polypropylene composition, the component B being one or more random propylene copolymer resins comprising propylene and one or more comonomers selected from ethylene and $C_4$-$C_{20}$ alpha-olefin; wherein the content of the one or more comonomers of the component B is at least 5.0 wt. % based on the total weight of the component B; and melt-blending the components to form a polypropylene composition having a comonomer content ranging from 2.5 to 4.5 wt. % based on the total weight of the polypropylene composition.

Starting from a given component A, the final comonomer content of the polypropylene composition is achieved by selecting a suitable content of the component B and an optional component E, wherein the components A, B and E have a defined comonomer content.

In an embodiment, the component A is selected from one or more virgin propylene polymer resins and/or recycled polypropylene resins. For example, the component A is selected from one or more virgin propylene polymer resins; one or more polypropylene post-consumer resins (PCR-PP); one or more polypropylene post-industrial resins (PIR-PP); and any mixture thereof.

In an embodiment, the component A is or comprises one or more propylene homopolymer resins.

In an embodiment, the component A has a melt index ($MI_2$) ranging from 2.5 to 40.0 g/10 min as determined according to ISO 1133-1:2011 at a temperature of 230° C. and under a load of 2.16 kg, preferably ranging from 3.0 to 30.0 g/10 min.

In an embodiment, the content of the component A is at least 35 wt. % based on the total weight of the polypropylene composition; preferably at least 40 wt. %.

In an embodiment, the component A is selected to have a yellow index lower than 5 as determined according to ASTM YI E313-00.

With preference, one or more of the following embodiments can be used to better define the component B:

the component B is one or more random propylene copolymer resins comprising propylene and ethylene.
the component B has content of comonomer ranging from at least 6.0 to 25.0 wt. % based on the total weight of the component B.
the component B has a melt index ($MI_2$) ranging from 1.0 to 50.0 g/10 min as determined according to ISO 1133-1:2011 at a temperature of 230° C. and under a load of 2.16 kg.
the component B is Ziegler-Natta catalyzed or metallocene-catalyzed; with preference, the component B is Ziegler-Natta catalyzed.

In an embodiment, the process further comprises the step of providing a component C being one or more nucleating agents and/or one or more clarifying agents and the step of melt-blending the components to form a polypropylene composition comprises melt-blending the component C with the other components.

With preference, the component C is or comprises one or more clarifying agents selected from sorbitol acetals, dibenzylidene nonitol (DBN), non-sorbitol, trisamide, phosphate ester salts, and any mixture thereof.

With preference, the component C is or comprises one or more clarifying agents selected from sorbitol acetals, dibenzylidene nonitol (DBN), non-sorbitol, trisamide, organophosphate, aluminum organophosphate, and any mixture thereof.

With preference, the component C is present in the polypropylene composition in a content of at least 150 ppm based on the total weight of the polypropylene composition; preferably ranging from 50 to 8000 ppm based on the total weight of the polypropylene composition; more preferably, ranging from 100 to 5000 ppm; even more preferably, ranging from 500 to 3000 ppm.

In an embodiment, the process further comprises the step of providing a component D being one or more visbreaking agents and the step of melt-blending the components to form a polypropylene composition comprises melt-blending the component D with the other components.

With preference, the component D is selected from 2,5-dimethyl-2,5-bis(tert-butyl-peroxy)hexane, 2,5-dimethyl-2,5-bis(tert-butyl-peroxy)hexyne-3, dicumyl-peroxide, di-tert-butyl-peroxide, tert-butylcumyl-peroxide, bis-(tert-butylperoxy-isopropyl)benzene, 3,6,9-triethyl-3,6,9-trimethyl-1,4,7-trioxonane, 1,2,4,5,7,8-Hexoxonane, 3,6,9-trimethyl-, 3,6,9-tris(Ethyl and Propyl) derivatives, and any mixture thereof.

With preference, the component D is present in the polypropylene composition in a content ranging from 50 to 900 ppm based on the total weight of propylene composition, preferably from 70 to 500 ppm.

In an embodiment, the process further comprises the step of providing a component E being a viscosity modulator, wherein the component E is selected from one or more propylene homopolymer resins and/or one or more random propylene copolymer resins and the step of melt-blending the components to form a polypropylene composition comprises melt-blending the component E with the other components.

With preference, the component E has a melt index ($MI_2$) ranging from 0.1 to 200.0 g/10 min as determined according to ISO 1133-1:2011 at a temperature of 230° C. and under a load of 2.16 kg; with preference, from 0.8 to 200.0 g/10 min.

With preference, the component E has a melt index greater than the melt index of the component A. This embodiment allows increasing the melt index of the composition without the use of visbreaking agents such as peroxides. For example, the component E may have a melt index ($MI_2$) greater than 40.0 g/10 min as determined according to ISO 1133-1:2011 at a temperature of 230° C. and under a load of 2.16 kg; with preference, greater than 80.0 g/10 min.

With preference, the component E has a melt index lower than the melt index of the component A. This embodiment allows reducing the melt index of the composition. For example, the component E may have a melt index ($MI_2$) equal to or lower than 80.0 g/10 min as determined according to ISO 1133-1:2011 at a temperature of 230° C. and under a load of 2.16 kg; with preference lower than 40.0 g/10 min.

The component E may be Ziegler-Natta catalyzed or metallocene-catalyzed. With preference, the component E is metallocene-catalyzed.

With preference, the component E is provided at a content ranging from 10 to 30 wt. % based on the total weight of the polypropylene composition, or from 15 to 25 wt. %.

In an embodiment, the process further comprises the step of providing a component F being one or more neutralizing agents and the step of melt-blending the components to form a polypropylene composition comprises melt-blending the component F with the other components.

With preference, the component F is selected from calcium oxide, zinc oxide, calcium stearate, magnesium stearate, zinc stearate, sodium stearate, potassium stearate, hydrotalcite and mixtures thereof.

With preference, the component F is present in the polypropylene composition in a content ranging from 20 to 600 ppm based on the total weight of propylene composition, preferably from 30 to 500 ppm. For example, the component F is present in the polypropylene composition in a content of at least 100 ppm based on the total weight of propylene composition; preferably at least 150 ppm. In an embodiment, the process further comprises the step of providing a component G being one or more antistatic agents and the step of melt-blending the components to form a polypropylene composition comprises melt-blending the component G with the other components.

With preference, the component G is selected from fatty acid esters, fatty acid amides, ethoxylated alkylamines, diethanolamides, ethoxylated alcohols, and any mixture thereof.

With preference, the component G is present in the polypropylene composition in a content ranging from 100 to 20,000 ppm based on the total weight of propylene composition, preferably from 400 to 7,000 ppm.

According to a second aspect, the disclosure provides a polypropylene composition remarkable in that it comprises:
30 to 75 wt. % of a component A based on the total weight of the polypropylene composition, the component A being one or more propylene homopolymer resins, one or more random propylene copolymer resins comprising propylene and one or more comonomers selected from ethylene and $C_4$-$C_{20}$ alpha-olefin; wherein the content of the one or more comonomers is at most 1.0 wt. % based on the total weight of the random propylene copolymer resins, and any mixture thereof; and wherein the component A has a melt index ($MI_2$) ranging from 2.0 to 100.0 g/10 min as determined according to ISO 1133-1:2011 at a temperature of 230° C. and under a load of 2.16 kg; and
25 to 70 wt. % of a component B based on the total weight of the polypropylene composition, the component B being one or more random propylene copolymer resins comprising propylene and one or more comonomers selected from ethylene and $C_4$-$C_{20}$ alpha-olefin;
wherein the content of comonomer of the component B is at least 5.0 wt. % based on the total weight of the component B;
wherein the polypropylene composition has a comonomer content ranging from 2.5 to 4.5 wt. % based on the total weight of the polypropylene composition.

With preference, the polypropylene composition is produced by the process according to the first aspect.

For example, the polypropylene composition has a melt index ($MI_2$) ranging from 0.5 to 150.0 g/10 min as determined according to ISO 1133-1:2011 at a temperature of 230° C. and under a load of 2.16 kg; with preference, from 1.0 to 100.0 g/10 min.

The polypropylene composition may further comprise one or more selected from:
a component C being one or more nucleating agents and/or one or more clarifying agents; and/or
a component D being one or more visbreaking agents; and/or
a component E being a viscosity modulator, wherein the component E is selected one or more propylene homopolymer resins and/or one or more random propylene copolymer resins; and/or
a component F being one or more neutralizing agents, and/or
a component G being one or more antistatic agents.

In an embodiment, the component E has a melt index greater than the melt index of the component A. For example, the component E has a melt index ($MI_2$) greater than 80.0 g/10 min as determined according to ISO 1133-1:2011 at a temperature of 230° C. and under a load of 2.16 kg, wherein the component E is further selected to have a melt index greater than the melt index of the component A.

In another embodiment, the component E has a melt index lower than the melt index of the component A. For example, the component E has a melt index ($MI_2$) equal to or lower than 80.0 g/10 min as determined according to ISO 1133-1:2011 at a temperature of 230° C. and under a load of 2.16 kg wherein the component E is further selected to have a melt index lower than the melt index of the component A.

The polypropylene composition of the disclosure will advantageously show a tensile modulus ranging from 750 to 1250 MPa as determined according to ISO 527-1: 2019; an elongation at yield ranging from 9.6 to 15.9% as determined according to ISO 527-1: 2019 and a yield strength ranging from 20.8 to 34.7 MPa as determined according to ISO 527-1: 2019.

With preference, the polypropylene composition further has a haze at 1 mm thickness of less than 30%, measured according to ASTM D-1003-00, with preference less than 25%.

With preference, the polypropylene composition further has a yellow index of at most 10 as determined by ASTM YI E313-00.

According to a third aspect, the disclosure provides the use of recycled polypropylene resins selected from one or more polypropylene post-consumer resins (PCR) and/or one or more polypropylene post-industrial resins (PIR-PP) wherein the polypropylene resins are or comprise one or more propylene homopolymer resins, one or more random propylene copolymer resins comprising propylene and one or more comonomers selected from ethylene and $C_4$-$C_{20}$ alpha-olefin; wherein the content of the one or more comonomers is at most 1.0 wt. % based on the total weight of the random copolymer resins, and any mixture thereof, and wherein the recycled polypropylene resins have a melt index ranging from 2.0 to 100.0 g/10 min as determined according to ISO 1133-1:2011 at a temperature of 230° C. and under a load of 2.16 kg; in a process to produce a polypropylene composition according to the second aspect.

According to a fourth aspect, the disclosure provides an article made from the polypropylene composition according to the second aspect wherein the composition.

In an embodiment, the article is produced by extrusion or by injection molding. For example, the article is selected from caps and closures and the composition has a melt index ($MI_2$) ranging from 10.0 to 80.0 g/10 min as determined according to ISO 1133-1:2011 at a temperature of 230° C. and under a load of 2.16 kg.

DETAILED DESCRIPTION

For the disclosure, the following definitions are given.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g., 1 to 5 includes 1, 2, 3, 4, 5 when referring to, for example, a number of elements, and can also include 1.5, 2, 2.75 and 3.80, when referring to, for example, measurements). The recitation of endpoints also includes the recited endpoint values themselves (e.g., from 1.0 to 5.0 includes both 1.0 and 5.0). Any numerical range recited herein is intended to include all sub-ranges subsumed therein.

The reference throughout this specification to "one embodiment" or "an embodiment" means that a particular feature, structure or characteristic described in connection with the embodiment is included in at least one embodiment of the present disclosure. The particular features, structures, characteristics or embodiments may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure and from different embodiments, as would be understood by those in the art.

Unless otherwise defined, all terms used in disclosing the disclosure, including technical and scientific terms, have the meaning as commonly understood by one skilled in the art to which this disclosure belongs. By means of further guidance, definitions for the terms used in the description are included to better appreciate the teaching of the present disclosure.

As used herein, the expression "melt blending" involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter-rotating screws, non-intermeshing co-rotating or counter-rotating screws, reciprocating screws, screws with pins, barrels with pins, rolls, rams, helical rotors, or combinations comprising at least one of the foregoing. Melt blending may be conducted in machines such as, single or multiple screw extruders, Buss kneader, Eirich mixers, Henschel, helicones, Ross mixer, Banbury, roll mills, moulding machines such as injection moulding machines, vacuum forming machines, blow moulding machines, or the like, or combinations comprising at least one of the foregoing machines. It is generally desirable during melt or solution blending of the composition to impart specific energy of about 0.01 to about 10 kilowatt-hours/kilogram (kW h/kg) of the composition. In a preferred embodiment, melt blending is performed in a twin-screw extruder, such as a Brabender co-rotating twin-screw extruder.

The terms "polypropylene" (PP) and "propylene polymer" may be used synonymously. The term "polypropylene" encompasses homopolymer of propylene as well as copolymer of propylene which can be derived from propylene and one or more comonomers selected from the group consisting of ethylene and $C_4$-$C_{20}$ alpha-olefins, such as 1-butene, 1-pentene, 4-methyl-1-pentene, 1-hexene, 1-octene, 1-decene, 1-dodecene, 1-tetradecene, 1-hexadecene, 1-octadecene and 1-eicosene.

The terms "polypropylene resin" as used herein, refer to polypropylene fluff or powder that is extruded, and/or melted and/or pelletized and can be produced through compounding and homogenizing of the polypropylene resin as taught herein, for instance, with mixing and/or extruder equipment. As used herein, the term "polypropylene" may be used as a shorthand for "polypropylene resin". The terms "fluff" or "powder" as used herein refer to polypropylene material with the hard catalyst particle at the core of each grain and is defined as the polymer material after it exits the polymerization reactor (or the final polymerization reactor in the case of multiple reactors connected in series).

Unless otherwise indicated, density and melt index for the polypropylene resin respectively refer to the density and melt index as measured on the polypropylene resin as defined above.

The terms "virgin polypropylene" are used to denote a polypropylene directly obtained from a propylene polymerization plant. The terms "directly obtained" are meant to include that the polypropylene may optionally be passed through a pelletization step or an additivation step or both.

The terms "post-consumer resin", which may be abbreviated as "PCR", is used to denote the component of domestic waste, household waste or end of life vehicle waste.

The terms "recycled polypropylene resins" refer to post-consumer resin (PCR) and/or post-industrial resins (PIR).

Ziegler-Natta catalyst systems are generally formed from the combination of a metal component (i.e. a catalyst precursor) with one or more additional components, such as a catalyst support, a co-catalyst and/or one or more electron donors.

Metallocene catalysts are compounds of Group IV transition metals of the periodic table such as titanium, zirconium, hafnium, etc., and have a coordinated structure with a metal compound and a ligand composed of one or two groups of cyclopentadienyl, indenyl, fluorenyl or their derivatives.

The particular features, structures, characteristics or embodiments may be combined in any suitable manner, as would be apparent to a person skilled in the art from this disclosure, in one or more embodiments.

The disclosure provides a process to produce a polypropylene composition comprising the steps of:
providing from 30 to 75 wt. % of a component A based on the total weight of the polypropylene composition, the component A is selected from one or more propylene homopolymer resins, one or more random propylene copolymer resins comprising propylene and one or more comonomers selected from ethylene and $C_4$-$C_{20}$ alpha-olefin; wherein the content of the one or more comonomers is at most 1.0 wt. % based on the total weight of the random propylene copolymer resins, and any mixture thereof; and wherein the component A has a melt index ($MI_2$) ranging from 2.0 to 100.0 g/10 min as determined according to ISO 1133-1:2011 at a temperature of 230° C. and under a load of 2.16 kg;
providing from 25 to 70 wt. % of a component B based on the total weight of the polypropylene composition, the component B being one or more random propylene copolymer resins comprising propylene and one or more comonomers selected from ethylene and $C_4$-$C_{20}$ alpha-olefin; wherein the content of the one or more comonomers of the component B is at least 5.0 wt. % based on the total weight of the component B;
optionally, providing a component C being one or more nucleating agents and/or one or more clarifying agents;
optionally, providing a component D being one or more visbreaking agents;
optionally, providing a component E being a viscosity modulator, wherein the component E is selected from one or more propylene homopolymer resins and/or one or more random propylene copolymer resins;
optionally, providing a component F being one or more neutralizing agents;
optionally, providing a component G being one or more antistatic agents;
melt-blending the components to form a polypropylene composition having a comonomer content ranging from 2.5 to 4.5 wt. % based on the total weight of the polypropylene composition.

In an embodiment, the component E has a melt index greater than the melt index of the component A. For example, the component E has a melt index ($MI_2$) greater than 40.0 g/10 min as determined according to ISO 1133-1:2011 at a temperature of 230° C. and under a load of 2.16 kg, wherein the component E is further selected to have a melt index greater than the melt index of the component A; preferably greater than 80.0 g/10 min.

In another embodiment, the component E has a melt index lower than the melt index of the component A. For example, the component E has a melt index ($MI_2$) equal to or lower than 80.0 g/10 min as determined according to ISO 1133-1:2011 at a temperature of 230° C. and under a load of 2.16 kg wherein the component E is further selected to have a melt index lower than the melt index of the component A; preferably equal to or lower than 40.0 g/10 min; more preferably equal to or lower than 20.0 g/10 min.

The component A may be selected from one or more virgin propylene polymer resins and/or recycled polypropylene resins. For example, component A may be selected from one or more virgin propylene polymer resins; one or more polypropylene post-consumer resins (PCR-PP); one or more polypropylene post-industrial resins (PIR-PP); and any mixture thereof. For example, the component A is or comprises recycled polypropylene resins selected from one or more post-consumer resins (PCR) and/or one or more polypropylene post-industrial resins (PIR-PP).

Thus, in an embodiment, the disclosure provides a process to produce a polypropylene composition comprising recycled polypropylene resins comprising the steps of:
providing from 30 to 75 wt. % of a component A based on the total weight of the polypropylene composition, the component A is selected from one or more propylene homopolymer resins, one or more random propylene copolymer resins comprising propylene and one or more comonomers selected from ethylene and $C_4$-$C_{20}$ alpha-olefin; wherein the content of the one or more comonomers is at most 1.0 wt. % based on the total weight of the random propylene copolymer resins, and any mixture thereof; wherein the component A is or comprises recycled polypropylene resins selected from one or more post-consumer resins (PCR) and/or one or more polypropylene post-industrial resins (PIR-PP); and wherein the component A has a melt index ($MI_2$) ranging from 2.0 to 100.0 g/10 min as determined according to ISO 1133-1:2011 at a temperature of 230° C. and under a load of 2.16 kg;
providing from 25 to 70 wt. % of a component B based on the total weight of the polypropylene composition, the component B being one or more random propylene copolymer resins comprising propylene and one or more comonomers selected from ethylene and $C_4$-$C_{20}$ alpha-olefin; wherein the content of the one or more comonomers of the component B is at least 5.0 wt. % based on the total weight of the component B;
optionally, providing a component C being one or more nucleating agents and/or one or more clarifying agents;
optionally, providing a component D being one or more visbreaking agents;
optionally, providing a component E being a viscosity modulator, wherein the component E is selected from one or more propylene homopolymer resins and/or one or more random propylene copolymer resins;
optionally, providing a component F being one or more neutralizing agents;
optionally, providing a component G being one or more antistatic agents;
melt-blending the components to form a polypropylene composition having a comonomer content ranging from 2.5 to 4.5 wt. % based on the total weight of the polypropylene composition.

It has been found that, surprisingly, it is possible to produce polypropylene compositions containing a high content of propylene homopolymer resins and/or of minirandom propylene copolymer resins (i.e., random propylene copolymer resins with a comonomer content of at most 1.0 wt. %) wherein the polypropylene compositions show an improved balance of properties rendering them comparable to polypropylene random copolymer resins. For example, the polypropylene compositions show an improved balance of mechanical properties such as an improved balance of tensile modulus, elongation at yield and yield strength. With preference, the polypropylene compositions show an improved balance of mechanical properties and optical properties, such as an improved balance of tensile modulus, elongation at yield, yield strength and haze. With preference, the polypropylene compositions show an improved balance of mechanical properties, optical properties and colour properties, such as an improved balance of tensile modulus elongation at yield, yield strength, haze and yellow index.

The resulting polypropylene-based composition may comprise a high content of propylene polymer having a low content of comonomer or being devoid of comonomer, such as recycled polypropylene resins being or comprising propylene homopolymer, and at the same time can be used to manufacture articles which are commonly produced from polypropylene random copolymer resins.

Selection of One or More Polypropylene Homopolymer Resins and/or Mini-Random Copolymer Resins (Component A)

The propylene composition comprises a component A selected from one or more propylene homopolymer resins, one or more random propylene copolymer resins comprising propylene and one or more comonomers selected from ethylene and $C_4$-$C_{20}$ alpha-olefin; wherein the content of the one or more comonomers is at most 1.0 wt. % based on the total weight of the random propylene copolymer resins, and any mixture thereof. With preference, the propylene composition comprises one or more propylene homopolymer resins. The content of the component A in the polypropylene composition is ranging from 30 to 75 wt. % based on the total weight of the polypropylene composition; preferably from 40 to 70 wt. %

The content of the component A in the polypropylene composition is at least 30 wt. % based on the total weight of the polypropylene composition; preferably, at least 32 wt. %, more preferably, at least 35 wt. %; and even more preferably, at least 40 wt. %.

The content of the component A in the polypropylene composition is at most 75 wt. % based on the total weight of the polypropylene composition; preferably, at most 72 wt. %, more preferably, at most 70 wt. %; and even more preferably, at most 65 wt. %, and most preferably, at most 60 wt. %.

The component A can have a melt index ($MI_2$) ranging from 2.0 to 100.0 g/10 min as determined according to ISO 1133-1:2011 at a temperature of 230° C. and under a load of 2.16 kg; preferably ranging from 2.0 to 50.0 g/10 min; more preferably ranging from 2.5 to 40.0 g/10 min; even more preferably ranging from 3.0 to 30.0 g/10 min; and most preferably from 4.0 to 20.0 g/10 min.

With preference, component A has an $MO_2$ of at least 2.0 g/10 min as determined according to ISO 1133-1:2011 (230° C., 2.16 kg); preferably at least 2.5 g/10 min; more preferably at least 3.0 g/10 min, even more preferably at least 4.0 g/10 min; most preferably at least 5.0 g/10 min.

Preferably, the component A has an $MI_2$ of at most 100.0 g/10 min as determined according to ISO 1133-1:2011 (230° C., 2.16 kg); preferably of at most 80.0 g/10 min; preferably of at most 60.0 g/10 min, preferably of at most 50.0 g/10 min, preferably of at most 40.0 g/10 min, preferably of at most 30.0 g/10 min, preferably of at most 25.0 g/10 min, preferably of at most 20.0 g/10 min, more preferably of at most 17.0 g/10 min and even more preferably of at most 15.0 g/10 min, most preferably of at most 13.0 g/10 min.

In an embodiment, the component A has an Mw/Mn (i.e., MWD) ranging from 2.5 to 10.0; preferably from 3.0 to 9.0; more preferably from 3.2 to 8.5, even more preferably from 3.5 to 8.0.

In an embodiment, the component A is one or more recycled polypropylene resins and has an Mw/Mn (i.e., MWD) ranging from 2.5 to 6.5; preferably from 3.0 to 6.0; more preferably from 3.2 to 5.5, even more preferably from 3.5 to 5.0.

In an embodiment, the component A has an Mz/Mw (i.e., D') ranging from 1.8 to 6.0; preferably from 2.0 to 5.5; more preferably from 2.3 to 5.2, even more preferably from 2.5 to 5.0.

In an embodiment, the component A is one or more recycled polypropylene resins and has an Mz/Mw (i.e., D') ranging from 2.0 to 4.5; preferably from 2.2 to 4.2; more preferably from 2.5 to 4.0.

The component A is selected from one or more virgin propylene polymer resins; one or more polypropylene post-consumer resins (PCR-PP); one or more polypropylene post-industrial resins (PIR-PP); and any mixture thereof. In an embodiment of the disclosure, the component A is or comprises one or more virgin propylene polymer resins. In an embodiment of the disclosure, the component A is or comprises one or more polypropylene post-consumer resins (PCR-PP) and/or one or more polypropylene post-industrial resins (PIR-PP).

The component A may be or comprise one or more polymer propylene homopolymer resins. A homopolymer according to this disclosure has less than 0.2 wt. %, preferably less than 0.1 wt. %, more preferably less than 0.05 wt. % and most preferably less than 0.005 wt. %, of alpha-olefins other than propylene in the polymer. Most preferred, no other alpha-olefins are detectable. Accordingly, when the polypropylene resin is a homopolymer of propylene, the comonomer content in the polypropylene resin is less than 0.2 wt. %, more preferably less than 0.1 wt. % based on the total weight of the polypropylene resin.

The component A may be or comprise one or more random propylene copolymer resins comprising propylene and one or more comonomers selected from ethylene and $C_4$-$C_{20}$ alpha-olefin; wherein the content of the one or more comonomers is at most 1.0 wt. % based on the total weight of the random propylene copolymer resins. As a consequence, the content of the one or more comonomers is at most 1.0 wt. % based on the total weight of the component A.

Examples of virgin propylene homopolymer resins that are commercially available and can be used in the process of the disclosure are TotalEnergies PPH 5060, PPH 7060, PPH 7042, PPH 7089, PPH 12020 and PPH 9020.

In an embodiment of the disclosure, the component A is or comprises post-consumer resin (PCR). The post-consumer resin (PCR) may contain one or more polymers different from polypropylene such as some polyethylene.

The polypropylene post-consumer resin (PCR-PP) is preferably originated from a specific collection of domestic or household waste, and/or from end-of-life vehicles (ELV) waste. With preference, the polypropylene post-consumer resin (PCR-PP) is devoid of industrial waste. However, any polypropylene post-consumer and post-industrial resin fulfilling the requirements of the disclosure may be used. Suitable polypropylene post-consumer resins are commercially available.

The selected polypropylene post-consumer resin (PCR-PP) may comprise up to 5.0 wt. % of one or more polymers different from polypropylene, based on the total weight of the polypropylene post-consumer resin (PCR-PP). In some embodiments, the PCR-PP comprises up to 4.0 wt. % of one or more polymers different from polypropylene, based on the total weight of the PCR-PP, preferably up to 3.0 wt. %, more preferably up to 2.0 wt. %, even more preferably up to 1.0 wt. % and most preferably up to 0.5 wt. %.

The one or more polymers different from polypropylene can be or comprise polyethylene, polyamide, polyester, ethylene vinyl alcohol (EVOH) and any mixture thereof.

Selection of One or More Random Propylene Copolymer Resins (Component B)

The polypropylene composition comprises one or more random propylene copolymer resins. The content of the component B in the polypropylene composition is ranging from 25 to 70 wt. % based on the total weight of the polypropylene composition; preferably from 30 to 60 wt. %.

The content of the component B in the polypropylene composition is at least 25 wt. % based on the total weight of the polypropylene composition; preferably at least 28 wt. %, more preferably at least 30 wt. %; and even more preferably at least 32 wt. %.

The content of the component B in the polypropylene composition is at most 70 wt. % based on the total weight of the polypropylene composition; preferably at most 68 wt. %, more preferably at most 65 wt. %; and even more preferably at most 60 wt. %.

The component B is one or more random propylene copolymer resins comprising propylene and one or more comonomers selected from ethylene and $C_4$-$C_{20}$ alpha-olefin; with the content of the one or more comonomers being of at least 5 wt. % based on the total weight of the component B.

In an embodiment, the component B is one or more random propylene copolymer resins comprising propylene and one or more comonomers selected from ethylene, 1-butene, 1-hexene, 1-octene and any combination thereof. With preference, the component B is one or more random propylene copolymer resins comprising propylene and ethylene.

The content of the one or more comonomers is high and is at least 5.0 wt. % based on the total weight of the component B. For example, the content of the one or more comonomers is at least 5.2 wt. % based on the total weight of the component B; preferably, at least 5.5 wt. %; more preferably, at least 6.0 wt. %; most preferably, at least 6.5 wt. % and even most preferably at least 7.0 wt. %. In some embodiment the content of the one or more comonomers is very high and is at least 8.0 wt. % based on the total weight of the component B, preferably, at least 8.5 wt. %; more preferably, at least 9.0 wt. %; most preferably at least 9.5 wt. % and even most preferably at least 10.0 wt. %.

With preference, the content of the one or more comonomers is at least 25.0 wt. % based on the total weight of the component B. For example, the content of the one or more comonomers is at most 22.0 wt. % based on the total weight of the component B; preferably, at most 20.0 wt. %; more preferably, at most 18.0 wt. %; most preferably, at most 16.0 wt. % and even most preferably at most 15.0 wt. % or at most 14.0 wt. % or at most 12.0 wt. %. In some embodiment the content of the one or more comonomers is at most 11.0 wt. % based on the total weight of the component B, preferably, at most 10.5 wt. %; more preferably, at most 10.0 wt. %; most preferably, at most 9.5 wt. % and even most preferably at most 9.0 wt. %.

In an embodiment, the content of the one or more comonomers of the component B is ranging from 5.0 to 25.0 wt. % based on the total weight of the component B; preferably from 5.5 to 18.0 wt. %; more preferably from 6.0 to 15.0 wt. %; most preferably from 6.5 to 12.0 wt. % and even most preferably from 7.0 to 10 wt. %. In some embodiments, the content of the one or more comonomers is ranging from 5.0 to 11.0 wt. % based on the total weight of the component B or from 8.0 to 15.0 wt. %.

The component B can have a melt index ($MI_2$) ranging from 1.0 to 100.0 g/10 min as determined according to ISO 1133-1:2011 at a temperature of 230° C. and under a load of 2.16 kg; preferably ranging from 1.0 to 50.0 g/10 min; preferably ranging from 1.5 to 48.0 g/10 min; preferably ranging from 2.0 to 45.0 g/10 min; more preferably ranging from 2.5 to 40.0 g/10 min; even more preferably ranging from 3.0 to 30.0 g/10 min; and most preferably from 4.0 to 20.0 g/10 min.

With preference, component B has an $MI_2$ of at least 1.0 g/10 min as determined according to ISO 1133-1:2011 (230° C., 2.16 kg); preferably at least 1.5 g/10 min; preferably at least 2.0 g/10 min; more preferably at least 3.0 g/10 min, even more preferably at least 4.0 g/10 min; most preferably at least 5.0 g/10 min.

Preferably, the component B has an $MI_2$ of at most 100.0 g/10 min as determined according to ISO 1133-1:2011 (230° C., 2.16 kg); preferably of at most 80.0 g/10 min; preferably of at most 60.0 g/10 min, preferably of at most 50.0 g/10 min, preferably of at most 48.0 g/10 min, preferably of at most 45.0 g/10 min, preferably of at most 40.0 g/10 min, preferably of at most 30.0 g/10 min, preferably of at most 25.0 g/10 min, preferably of at most 20.0 g/10 min, more preferably of at most 17.0 g/10 min and even more preferably of at most 15.0 g/10 min, most preferably of at most 13.0 g/10 min.

In an embodiment, the component B has an Mw/Mn (i.e., MWD) ranging from 2.5 to 12.0; preferably from 3.0 to 11.0; more preferably from 4.0 to 10.0, even more preferably from 5.0 to 9.0.

In an embodiment, the component B has an Mz/Mw (i.e. D') ranging from 2.0 to 6.0; preferably from 2.5 to 5.8; more preferably from 2.8 to 5.5, even more preferably from 3.0 to 5.0.

The component B can be produced using any kind of catalyst. In an embodiment, the component B is Ziegler-Natta or metallocene-catalyzed; preferably the component B is Ziegler-Natta catalysed.

In some embodiments, component B is prepared using a metallocene catalyst system.

Examples of random propylene copolymer resins that can be used in the process of the disclosure are polypropylene Z9450, PPR3221, PPR10232, PPR12232 that are commercially available from TotalEnergies. Vistamaxx 6202 is commercially available from Exxon Mobil. Eltex P KS400 series from Ineos Olefins and Polymers Europe. Adsyl series from LyondellBasell Industries.

The Optional Component C

In some embodiments, the process further comprises the step of providing a component C being one or more nucleating agents and/or one or more clarifying agents. Then, the step of melt-blending the components to form a polypropylene composition comprises melt-blending the component C with the other components, so that the polypropylene composition comprises one or more nucleating agents and/or one or more clarifying agents.

A nucleating agent is defined to be an additive that forms nuclei in a polymer melt to promote the growth of crystals. In addition, a nucleating agent is often a clarifying agent, or clarity-enhancing agent, respectively. It is noted that all clarifying agents are also nucleating agents.

Suitable nucleating agents for use in the present disclosure can be selected from any of the nucleating agents known to the skilled person. In an embodiment, the nucleating agent is an alpha-nucleating agent. In some embodiment, the alpha-nucleating agent is selected from the group comprising talc, carboxylate salts, sorbitol acetals, phosphate ester salts, substituted benzene tricarboxamides and polymeric nucleating agents, as well as blends thereof.

In an embodiment, the component C is or comprises one or more nucleating agents selected from talc, titanium dioxide, magnesium oxide, 4-tert-butylbenzoic acid, adipic acid, diphenylacetic acid, sodium succinate, sodium benzoate, carboxylic acid salts, sorbitol acetals, organophosphate salts and/or esters, trisamide and any combination thereof.

Examples of suitable carboxylate salts include organocarboxylic acid salts. Particular examples are sodium benzoate and lithium benzoate. The organocarboxylic acid salts may also be alicyclic organocarboxylic acid salts, such as bicyclic organodicarboxylic acid salts.

Examples of suitable talc are fine talc commercially available from Rio Tinto Luzenac and Jetfine. An example of Trisamide is the commercially available Ciba XT 386.

High-speed nucleators include the phosphate esters NA-11 and NA-21 from Asahi-Denka Kogyo (ADK, or Amfine Chemical in the USA) and Irgastab NA 11 UH from Ciba, and Milliken Chemical's HPN-68.

Examples of suitable phosphate ester salts include salts of 2,2'-methylene-bis-(4,6-di-tert-butylphenyl)phosphate. Such phosphate ester salts are, for example available, as NA-1 1 or NA-21 from Asahi Denka. Examples of suitable substituted tricarboxamides include compounds of general formula (I):

(I)

wherein R1, R2 and R3, independently of one another, are selected from $C_1$-$C_{20}$ alkyl, $C_5$-$C_{12}$ cycloalkyl, or phenyl, each of which may in turn be substituted with one or more $C_1$-$C_{20}$ alkyl, $C_5$-$C_{12}$ cycloalkyl, phenyl, hydroxyl, $C_1$-$C_{20}$ alkylamino or $C_1$-$C_{20}$ alkyloxy etc. Examples of $C_1$-$C_{20}$ alkyl include methyl, ethyl, n-propyl, n-butyl, iso-butyl, tert-butyl, n-pentyl, iso-pentyl, 1,1-dimethylpropyl, 1,2-dimethylpropyl, 3-methylbutyl, hexyl, heptyl, octyl or 1,1,3,3-tetramethylbutyl. Examples of $C_5$-$C_{12}$ cycloalkyl include cyclopentyl, cyclohexyl, cyclooctyl, cyclododecyl, adamantyl, 2-methylcyclohexyl, 3-methylcyclohexyl or 2,3-dimethylcyclohexyl. Such nucleating agents are disclosed in WO03/102069 and by Blomenhofer et al. in Macromolecules, 2005, 38, 3688-3695. Non-limiting examples of polymeric nucleating agents include polymeric nucleating agents containing vinyl compounds, such as, for example, those disclosed in EP0152701 and EP0368577. Polymeric nucleating agents containing vinyl compounds can either be physically or chemically blended with the polypropylene. Suitable vinyl compounds include vinyl cycloalkanes or vinyl cycloalkenes having at least 6 carbon atoms, such as, for example, vinyl cyclopentane, vinyl-3-methyl cyclopentane, vinyl cyclohexane, vinyl-2-methyl cyclohexane, vinyl-3-methyl cyclohexane, vinyl norbornane, vinyl cyclopentene, vinyl cyclohexene, vinyl-2-methyl cyclohexene. Further examples of polymeric nucleating agents include poly-3-methyl-1-butene, polydimethylstyrene, polysilanes and polyalkylxylenes. These polymeric nucleating agents can be introduced into the polypropylene either by chemical or by physical blending.

Beta nucleating agents useful in embodiments disclosed herein induce the formation of beta-crystals in polypropylene, and may include various organic and inorganic nucleating agents, such as: the gamma-crystalline form of a quinacridone colorant Permanent Red E3B "Q-Dye;" the bisodium salt of o-phthalic acid; the aluminum salt of 6-quinizarin sulfonic acid; isophthalic and terephthalic acids; and N',N'-dicyclohexyl-2,6-naphthalene dicarboxamide, also known as NJStar NU-100, available from the New Japan Chemical Co.; nucleating agents based upon salts of rosin/adiebetic acid; zinc (II) monoglycerolate; nucleating agents based upon diamide compounds as disclosed in U.S. Pat. No. 6,235,823, such as N-cyclohexyl-4-(N-cyclohexylcarbonylamino)benzamide and N,N'-1,4-cyclohexane-bis-benzamide, for example; nucleating agents based upon trimesic acid derivatives, such as disclosed in WO02/46300, WO03/102069, WO2004/072168, including, for example, 1,3,5-benzenetricarboxylic acid tris(cyclopentylamide), 1,3,5-benzenetricarboxylic acid tris(cyclohexylamide), and 1,3,5-benzenetricarboxylic acid tris(tert-butyl)amide. Beta nucleating agents as described in JPH0733895 and CN1568845 may also be used. Other suitable beta nucleating agents are disclosed in DE3,610,644, prepared from two components, (A) an organic dibasic acid, such as pimelic acid, azelaic acid, o-phthalic acid, terephthalic acid, and isophthalic acid; and (B) an oxide, hydroxide or an acid salt of a metal of Group II, such as magnesium, calcium, strontium, and barium. The acid salt of the second component (B) may be derived from an organic or inorganic acid, such as a carbonate or a stearate.

In an embodiment, the component C is or comprises one or more clarifying agents selected from sorbitol acetals, dibenzylidene nonitol (DBN); non-sorbitol, trisamide, phosphate ester salts and any combination thereof.

With preference, the component C is or comprises one or more clarifying agents selected from sorbitol acetals, dibenzylidene nonitol (DBN), non-sorbitol, trisamide, organophosphate and aluminum organophosphate and any mixture thereof.

Examples of suitable sorbitol acetals include dibenzylidene sorbitol (DBS), bis(p-methyl dibenzylidene sorbitol) (MDBS), bis(p-ethyl-dibenzylidene sorbitol), bis(3,4-dimethyl-dibenzylidene sorbitol) (DMDBS), and bis(4-propylbenzylidene) propyl sorbitol. Bis(3,4-dimethyl-dibenzylidene sorbitol) (DMDBS) and bis(4-propylbenzyhdene) propyl sorbitol are preferred. These can for example be obtained from Milliken Chemical under the trade names of Millad 3905, Millad 3940, Millad 3988.

Example of nonitol is the commercially available Milliken NX8000. Example of non-sorbitol is the commercially available RiKA PC1. Example of Trisamide is the commercially available Ciba XT 386.

While it is clear to the skilled person that the amount of the component C to be added depends upon its crystallization/clarification efficiency, for the present disclosure the component C is present in the polypropylene in a content of at least 150 ppm based on the total weight of the composition, preferably at least 200 ppm; more preferably at least 500 ppm, even more preferably at least 800 ppm and most preferably at least 1000 ppm. It is present in an amount of at most 8000 ppm, preferably of at most 5000 ppm, more preferably of at most 4000 ppm, even more preferably of at most 3000 ppm and most preferably of at most 2500 ppm.

The Optional Component D

The process may further comprise the step of providing a component D being one or more visbreaking agents. Then, the step of melt-blending the components to form a polypropylene composition comprises melt-blending the component D with the other components, so that the polypropylene composition comprises one or more visbreaking agents.

In a preferred embodiment, the component D is selected from 2,5-dimethyl-2,5-bis(tert-butyl-peroxy)hexane (DHBP), 2,5-dimethyl-2,5-bis(tert-butyl-peroxy)hexyne-3 (DYBP), dicumyl-peroxide (DCUP), di-tert-butyl-peroxide (DTBP), tert-butylcumyl-peroxide (BCUP), bis (tert-butylperoxy-isopropyl)benzene (DIPP) 3,6,9-triethyl-3,6,9-trimethyl-1,4,7-triperoxonane, 1,2,4,5,7,8-Hexoxonane, 3,6,9-trimethyl-, 3,6,9-tris(Ethyl and Propyl) derivatives, and any mixture thereof. With preference, the component D is or comprises 2,5-dimethyl-2,5-bis(tert-butyl-peroxy)hexane (DHBP).

Suitable visbreaking agents are commercially available. For example 2,5-dimethyl-2,5-bis(tert-butyl-peroxy)hexane (DHBP) is sold under the tradenames Luperox 101 and Trigonox 101. 2,5-dimethyl-2,5-bis(tert-butyl-peroxy) hexyne-3 (DYBP) is sold under the tradenames Luperox 130 and Trigonox 145. Dicumyl-peroxide (DCUP) is sold under the tradenames Luperox DC and Perkadox BC. Di-tert-butyl-peroxide (DTBP) is sold under the tradenames Trigonox B and Luperox Di. Tert-butylcumyl-peroxide (BCUP) is sold under the tradenames Trigonox T and Luperox 801. Bis (tert-butylperoxy-isopropyl)benzene (DIPP) is sold under the tradenames Perkadox 14S and Lupperox DC. 3,6,9-triethyl-3,6,9-trimethyl-1,4,7-triperoxonane, 1,2,4,5,7,8-Hexoxonane is sold under the tradename Trigonox 301. 3,6,9-trimethyl-, 3,6,9-tris(Ethyl and Propyl) derivatives is sold under the tradename Trigonox 501.

Suitable amounts of the one or more visbreaking agents to be employed can be calculated based on the amount of polypropylene to be subjected to visbreaking, the $MI_2$ (230° C.) value of the polypropylene to be subjected to visbreaking and the desired target $MI_2$ (230° C.) of the polypropylene to be obtained.

Accordingly, the suitable content of component D (i.e., one or more visbreaking agents such one or more peroxides) is ranging from 50 to 900 ppm based on the total weight of propylene composition, preferably from 70 to 500 ppm.

The Optional Component E

The process may further comprise the step of providing a component E being a viscosity modulator, wherein the component E is selected from one or more propylene homopolymer resins and/or one or more random propylene copolymer resins. For example, the component E can have a melt index ($MI_2$) ranging from 0.1 to 200.0 g/10 min as determined according to ISO 1133-1:2011 at a temperature of 230° C. and under a load of 2.16 kg; preferably, from 0.8 to 200.0 g/10 min; for example, from 2.0 to 200.0 g/10 min or from 2.0 to 180 g/10 min.

In an embodiment, the component E has a melt index greater than the melt index of the component A. For example, the component E has a melt index ($MI_2$) greater than 40.0 g/10 min as determined according to ISO 1133-1:2011 at a temperature of 230° C. and under a load of 2.16 kg, wherein the component E is further selected to have a melt index greater than the melt index of the component A; preferably, greater than 60.0 g/10 min; more preferably, greater than 80.0 g/10 min; even more preferably greater than 90.0 g/10 min or greater than 100.0 g/10 min, most preferably greater than 110.0 g/10 min, even most preferably greater than 120.0 g/10 min, or greater than 130.0 g/10 min.

Preferably, wherein the component E is selected to have a melt index greater than the melt index of the component A, the component E has an $MI_2$ of at most 200.0 g/10 min as determined according to ISO 1133-1:2011 (230° C., 2.16 kg), preferably of at most 190.0 g/10 min, preferably of at most 180.0 g/10 min, preferably of at most 170.0 g/10 min, preferably of at most 160.0 g/10 min, preferably of at most 150.0 g/10 min.

For example, wherein the component E is selected to have a melt index greater than the melt index of the component A, the component E can have a melt index ($MI_2$) ranging from 40.0 to 200.0 g/10 min as determined according to ISO 1133-1:2011 at a temperature of 230° C. and under a load of 2.16 kg, preferably ranging from from 80.0 to 200.0 g/10 min or 100.0 to 200.0 g/10 min, more preferably ranging from 110 to 200.0 g/10 min, even more preferably ranging from 120.0 to 190.0 g/10 min, and most preferably from 130.0 to 180.0 g/10 min.

In another embodiment, the component E has a melt index lower than the melt index of the component A. For example, the component E has a melt index ($MI_2$) equal to or lower than 80.0 g/10 min as determined according to ISO 1133-1:2011 at a temperature of 230° C. and under a load of 2.16 kg wherein the component E is further selected to have a melt index lower than the melt index of the component A.

For example, wherein the component E is further selected to have a melt index lower than the melt index of the component A, the component E can have a melt index ($MI_2$) ranging from 0.1 to 100.0 g/10 min as determined according to ISO 1133-1:2011 at a temperature of 230° C. and under a load of 2.16 kg, preferably ranging from 0.8 to 100.0 g/10 min; more preferably, ranging from 1.0 to 80.0 g/10 min, even more preferably, ranging from 1.5 to 50.0 g/10 min, most preferably ranging from 1.8 to 20.0 g/10 min, and even most preferably from 2.0 to 10.0 g/10 min.

For example, wherein the component E is selected to have a melt index lower than the melt index of the component A, the component E has an $MI_2$ of at least 0.1 g/10 min as determined according to ISO 1133-1:2011 (230° C., 2.16 kg), preferably at least 0.3 g/10 min or at least 0.5 g/10 min at least 0.8 g/10 min or at least 1.0 g/10 min, more preferably at least 1.5 g/10 min, even more preferably at least 1.8 g/10 min, most preferably at least 2.0 g/10 min.

Preferably, wherein the component E is selected to have a melt index lower than the melt index of the component A, the component E has an $MI_2$ of at most 100.0 g/10 min as determined according to ISO 1133-1:2011 (230° C., 2.16 kg), preferably of at most 80.0 g/10 min, preferably of at most 60.0 g/10 min, preferably of at most 50.0 g/10 min, preferably of at most 40.0 g/10 min, preferably of at most 30.0 g/10 min, preferably of at most 25.0 g/10 min, preferably of at most 20.0 g/10 min, more preferably of at most 15.0 g/10 min and even more preferably of at most 10.0 g/10 min, most preferably of at most 8.0 g/10 min or at most 5.0 g/10 min or at most 2.5 g/10 min.

The content of the component E in the polypropylene composition is ranging from 5 to 40 wt. % based on the total weight of the polypropylene composition, preferably from 8 to 35 wt. %, for example, from 10 to 30 wt. % or from 15 to 25 wt. %.

The content of the component E in the polypropylene composition is at least 5 wt. % based on the total weight of the polypropylene composition, preferably at least 8 wt. %, more preferably at least 10 wt. %, and even more preferably at least 12 wt. % or at least 15 wt. %.

The content of the component E in the polypropylene composition is at most 40 wt. % based on the total weight of the polypropylene composition, preferably at most 35 wt. %, more preferably at most 30 wt. %, and even more preferably at most 28 wt. % or at most 25 wt. %.

In some preferred embodiments, component E is one or more propylene homopolymer resins and comprises at most 0.2 wt. % of one or more comonomers based on the total weight of component E, preferably at most 0.1 wt. %, preferably at most 0.05 wt. %, preferably at most 0.02 wt. %, preferably at most 0.01 wt. %. The comonomer content herein is measured by $^{13}$C NMR. In some preferred embodiments, component E comprises at most 0.2 wt. % of ethylene based on the total weight of component E, preferably at most 0.1 wt. %. The comonomer content herein is measured by $^{13}$C NMR.

In some preferred embodiments, component E is or comprises one or more random propylene copolymers, and has a comonomer content ranging from 0.5 to 8.0 wt. % based on the total weight of the component E; wherein the one or more comonomers selected from ethylene and $C_4$-$C_{20}$ alpha-olefin; preferably, from 1.0 to 7.0 wt. %; more preferably, from 1.5 to 6.0 wt. %: even more preferably from 2.0 to 5.0 wt. %.

In an embodiment, the component E is or comprises one or more random propylene copolymers, and has a comonomer content ranging from 5.0 to 8.0 wt. % based on the total weight of the component E; wherein the one or more comonomers selected from ethylene and $C_4$-$C_{20}$ alpha-olefin. In any case, it is understood that the component E is different from the component B.

The component E can be produced by polymerizing propylene with optional comonomers and optionally hydrogen, in the presence of a catalyst system. In some embodiment, the catalyst can be a Ziegler-Natta or a metallocene catalyst system. In some preferred embodiments, component E is prepared using a metallocene catalyst system.

In some embodiments, component E is prepared using a metallocene catalyst system. The term "metallocene catalysts" refers to compounds of Group IV transition metals of the periodic table such as titanium, zirconium, hafnium, etc., which have a coordinated structure with a metal compound and ligands composed of one or two groups of cyclopentadienyl, indenyl, fluorenyl or their derivatives. In some preferred embodiments, the metallocene catalyst system comprises a bridged metallocene component, a support and an activating agent.

The polymerization of propylene can, for example, be carried out in liquid propylene as a reaction medium (bulk polymerization). It can also be carried out in diluents, such as hydrocarbon that is inert under polymerization conditions (slurry polymerization). It can also be carried out in the gas phase. Those processes are well known to one skilled in the art.

Examples of suitable component E is the polypropylene available under the commercial denomination MH140CN0, MH04YN9, MR2002 or MR110MC2 from TotalEnergies.

The Optional Component F

The process may further comprise the step of providing a component F being one or more neutralizing agents. Then, the step of melt-blending the components to form a polypropylene composition comprises melt-blending the component F with the other components, so that the polypropylene composition comprises one or more neutralizing agents.

In an embodiment, the component F (i.e., the one or more neutralizing agents) is selected from calcium oxide, zinc oxide, calcium stearate, magnesium stearate, zinc stearate, sodium stearate, potassium stearate, hydrotalcite and mixtures thereof, preferably selected from calcium stearate, magnesium stearate, zinc stearate, sodium stearate, potassium stearate, and mixtures thereof, more preferably selected from calcium stearate, calcium oxide, zinc oxide and any mixture thereof. With preference, the component F is or comprises calcium stearate.

Accordingly, suitable content of component F (i.e., one or more neutralizing agents) is ranging from 20 to 600 ppm based on the total weight of propylene composition, preferably from 30 to 500 ppm.

When the one or more neutralizing agents are one or more alkali metal stearates, the content of the component F used may range from about 50 to about 600 ppm based on total weight of the polypropylene composition; preferably, from about 100 to about 500 ppm.

When the one or more neutralizing agents are calcium oxide and/or zinc oxide, the proportion of oxide used may range from about 50 to about 6000 ppm based on total weight of the polypropylene composition; preferably from range from about 100 to about 500 ppm.

For example, the component F is present in the polypropylene composition in a content of at least 100 ppm based on the total weight of propylene composition; preferably at least 150 ppm.

Without being bound by a theory, the presence of one or more neutralizing agents may be favorable to the final color properties of the polypropylene composition such as the yellow index. However, in case the person skilled in the art is willing to reduce the yellow index (in presence or in absence of the component F) one or more stabilising agents can be added to the polypropylene composition.

For example, the one or more stabilising agent can be a blend of 1:10 to 1:20 of phenolics antioxidants with phosphite antioxidants; or with blends of phenolics antioxidants and other secondary antioxidants. For example, a blend of Irganox1010, Irgafos 168 and optional Iragnox E201 is reported to be favorable to reduce the yellow index in WO2009007265 which is incorporated by reference.

In another example, the one or more stabilising agent can be a blend of one or more phenolic oxidants and/or phosphite antixoxidants that include trilauryl phosphite in combination with another phosphite; and optionally a color surpressant being a polyfunctional alcohol, amine or amide or mixtures thereof. Such blends are described in WO2007/017108 which is incorporated by reference.

The Optional Component G

The process may further comprise the step of providing a component G being one or more antistatic agents. Then, the step of melt-blending the components to form a polypropylene composition comprises melt-blending the component G with the other components, so that the polypropylene composition comprises one or more antistatic agents.

The choice of antistatic agent is not particularly limited and can be any generally used by the skilled person. It is, however, preferred that the component G is selected from fatty acid esters, fatty acid amides, ethoxylated alkylamines, diethanolamides, ethoxylated alcohols, and any mixture thereof.

Examples of fatty acid esters are esters of fatty acids with general formula $C_mH_{2m+1}COOH$, wherein $C_mH_{2m+1}$ is a, preferably linear, hydrocarbyl group (alkyl group) with m ranging from 1 to 35, preferably from 5 to 30, even more preferably from 10 to 25, and most preferably from 15 to 20. The most preferred fatty acid esters are glycerol monostearate, glycerol distearate and glycerol tristearate.

Examples of fatty acid amides are erucamide (cis-$CH_3$ $(CH_2)_7CH=CH(CH_2)_{11}CONH_2$) and behenamide ($CH_3$ $(CH_2)_{20}CONH_2$).

Examples of ethoxylated amines are those of general formula $C_mH_{2m+1}N(CH_2-CH_2-OH)_2$, wherein $C_mH_{2m+1}$ is an alkyl group with m ranging from 1 to 30.

Examples of diethanolamides are those of general formula $C_mH_{2m+1}-C(O)-N(CH_2-CH_2-OH)_2$, wherein $C_mH_{2m+1}$ is an alkyl group with m ranging from 1 to 30, preferably from 5 to 25 and most preferably from 10 to 20.

Examples of ethoxylated alcohols are those of general formula $H-(O-CH_2-CH_2)_n-C_mH_{2m+1}$, wherein $C_mH_{2m+1}$ is an alkyl group with m ranging from 1 to 30, preferably from 5 to 25 and most preferably from 10 to 20, and n is preferably from 1 to 15.

If present, component G (i.e., the one or more antistatic agents) is preferably comprised in the polypropylene composition in an amount of at least 100 ppm, more preferably of at least 200 ppm, even more preferably of at least 300 ppm, even more preferably of at least 400 ppm and most preferably of at least 500 ppm. Component G (i.e., the one or more antistatic agents) is preferably comprised in the polypropylene composition in an amount of at most 10,000 ppm more preferably of at most 9,000 ppm or 8,000 ppm, even more preferably of at most 7,000 ppm or 6,000 ppm and most preferably of at most 5,000 ppm.

It is understood that the process of the disclosure may comprise the addition of all components D, E, F and G in the propylene composition, or of one or more of the components D, E, F and/or G.

Thus, the compositions according to the disclosure may comprise
- components A and B
- components A, B and C,
- components A, B and D, or
- components A, B and E, or
- components A, B and F, or
- components A, B and G, or
- components A, B, C and D, or
- components A, B, C and E, or
- components A, B, C and F, or
- components A, B, C and G, or
- components A, B, D and E, or
- components A, B, D and F, or
- components A, B, D and G, or
- components A, B, E and F, or
- components A, B, E and G, or
- components A, B, F and G, or
- components A, B, C, D and E, or
- components A, B, C, D and F, or
- components A, B, C, D and G, or.
- components A, B, C, D, E and F, or
- components A, B, C, D, E and G, or
- components A, B, C, D, E, F and G.

The Polypropylene Composition

When the polypropylene composition comprises one or more post-consumer resins (PCR), the polypropylene composition may comprise at most 5.0 wt. % of one or more polymers different from polypropylene based on the total weight of the polypropylene composition; preferably at most 4.0 wt. %; more preferably at most 3.0 wt. %; even more preferably at most 2.0 wt. %; most preferably at most 1.0 wt. % and even most preferably at most 0.5 wt. % or at most 0.3 wt. %. The one or more polymers different from polypropylene can be or comprise polyethylene, polyamide, polyester, ethylene vinyl alcohol (EVOH) and any mixture thereof.

In an embodiment, the polypropylene composition comprises one or more polypropylene post-industrial resins (PIR-PP).

The disclosure provides a process to produce a propylene composition having an $MI_2$ ranging from 0.5 to 150.0 g/10 min as determined according to ISO 1133-2011 at a temperature of 230° C. and under a load of 2.16 kg. With preference, the polypropylene composition can have a melt index ($MI_2$) ranging from 0.8 to 120.0 g/10 min or from 1.0 to 100.0 g/10 min as determined according to ISO 1133-1: 2011 at a temperature of 230° C. and under a load of 2.16 kg; preferably ranging from from 1.3 to 150.0 g/10 min or from 1.5 to 120.0 g/10 min or from 2.0 to 100.0 g/10 min or 5.0 to 90.0 g/10 min; more preferably ranging from 8.0 to 85.0 g/10 min; even more preferably ranging from 10.0 to 80.0 g/10 min and most preferably from 12.0 to 75.0 g/10 min.

With preference, the polypropylene composition has an $MI_2$ of at least 0.5 g/10 min or at least 0.6 g/10 min as determined according to ISO 1133-1:2011 (230° C., 2.16 kg); preferably at least 0.8 g/10 min or at least 1.0 g/10 min or at least 1.3 g/10 min or at least 1.5 g/10 min at least 1.8 g/10 min or at least 2.0 g/10 min or at least 2.5 g/10 min or at least 5.0 g/10 min or at least 6.0 g/10 min, more preferably at least 8.0 g/10 min, even more preferably at least 12.0 g/10 min.

With preference, the polypropylene composition has an $MI_2$ of at most 150.0 g/10 min as determined according to ISO 1133-2011 at a temperature of 230° C. and under a load of 2.16 kg, preferably of at most 120.0 g/10 min, preferably of at most 100.0 g/10 min, preferably of at most 90.0 g/10 min, preferably of at most 75.0 g/10 min, preferably of at most 60.0 g/min, preferably of at most 50.0 g/10 min.

The polypropylene composition has a comonomer content ranging from 2.5 to 4.5 wt. % based on the total weight of the composition; preferably ranging from 2.6 to 4.4 wt. %; more preferably ranging from 2.7 to 4.3 wt. %; even more preferably ranging from 2.8 to 4.2 wt. %.

The comonomer content of the polypropylene composition (i.e., the final comonomer content) is obtained by selecting a suitable content of the component B and the optional component E to be added in the polypropylene composition, wherein the components A, B and E have a defined comonomer content. The person skilled in the art may calculate the comonomer content of the polypropylene composition using the following formula Final comonomer content=X comonomer content of component A+Y comonomer content of component B+Z comonomer content of component E.

X, Y and Z are the respective content of the Components A, B and E in the polypropylene composition, wherein X, Y and Z are ranging from 0 to 1, and X+Y+Z=1.

The calculated (final) comonomer content is an estimated value that can be used as guidance to the person skilled in the art to select a suitable content of the component B and may be slightly different from the comonomer content as determined by $^{13}$C-NMR analysis on the polypropylene composition.

For example, the polypropylene compositions show an improved balance of mechanical properties such as an improved balance of tensile modulus, elongation at yield and yield strength. With preference, the polypropylene compositions show an improved balance of mechanical properties and optical properties, such as an improved balance of tensile modulus, elongation at yield, yield strength and haze. In an embodiment, the polypropylene compositions show an improved balance of mechanical properties, optical properties and colour properties, such as an improved balance of tensile modulus elongation at yield, yield strength, haze and yellow index.

With preference, the polypropylene composition has a haze at 1 mm thickness of less than 30%, measured according to ASTM D-1003-00; preferably of less than 28%; more preferably of less than 25%. In some embodiments, the polypropylene composition has a haze at 1 mm thickness of less than 24%, measured according to ASTM D-1003-00. The polypropylene composition may have a haze at 1 mm thickness of at least 5% measured according to ASTM D-1003-00; preferably at least 10% more preferably at least 15%.

Preferably, the polypropylene composition has an elongation at yield of at least 9.6% as determined according to ISO 527-1: 2019 preferably of at least 10.2%. In some embodiments, the polypropylene composition has an elongation at yield of at most 15.9% as determined according to ISO 527-1: 2019, preferably at most 15.3% For example, the elongation at yield is ranging from 9.6 to 15.9% as determined according to ISO 527-1: 2019; with preference from 10.2% to 15.3%.

Preferably, the polypropylene composition has a tensile modulus of at least 750 MPa as determined according to ISO 527-1: 2019 preferably of at least 800 MPa. Preferably, the polypropylene composition has a tensile modulus of at most 1250 MPa, and preferably of at most 1200 MPa. For example, the polypropylene composition has a tensile modulus ranging from 750 to 1250 MPa as determined according to ISO 527-1: 2019; preferably ranging from 800 to 1200 MPa.

Preferably, the polypropylene composition has a yield strength of at least 20.8 MPa as determined according to ISO 527-1: 2019 preferably of at least 22.2 MPa. Preferably, the polypropylene composition has a yield strength of at most 34.7 MPa, and preferably of at most 33.7 MPa. For example, the polypropylene composition has a yield strength ranging from 20.8 to 34.7 MPa as determined according to ISO 527-1: 2019; preferably ranging from 22.2 to 33.7 MPa.

In an embodiment, the polypropylene composition has a yellow index of at most 10 by ASTM YI E313-00; preferably at most 8; more preferably at most 5.

The present disclosure provides for a propylene composition comprising 30 to 75 wt. % of a component A based on the total weight of the polypropylene composition, the component A being one or more propylene homopolymer resins, one or more random propylene copolymer resins comprising propylene and one or more comonomers selected from ethylene and $C_4$-$C_{20}$ alpha-olefin; wherein the content of the one or more comonomers is at most 1.0 wt. % based on the total weight of the random propylene copolymer resins, and any mixture thereof; and wherein the component A has a melt index (MI$_2$) ranging from 2.0 to 100.0 g/10 min as determined according to ISO 1133-1:2011 at a temperature of 230° C. and under a load of 2.16 kg;

25 to 70 wt. % of a component B based on the total weight of the polypropylene composition, the component B being one or more random propylene copolymer resins comprising propylene and one or more comonomers selected from ethylene and $C_4$-$C_{20}$ alpha-olefin; wherein the content of the one or more comonomers of the component B is at least 5.0 wt. % based on the total weight of the component B; and optionally one or more further components selected from a component C being one or more nucleating agents and/or one or more clarifying agents; a component D being one or more visbreaking agents; a component E being a viscosity modulator, wherein the component E is selected from one or more propylene homopolymer resins and/or one or more random propylene copolymers and wherein the component E has a melt index (MI$_2$) ranging from 0.1 to 200.0 g/10 min as determined according to ISO 1133-1:2011 at a temperature of 230° C. and under a load of 2.16 kg; a component F being one or more neutralizing agents, a component G being one or more antistatic agents and any mixture thereof;

wherein the polypropylene composition has a comonomer content ranging from 2.5 to 4.5 wt. % based on the total weight of the polypropylene composition.

Test Methods

The melt index (MI$_2$) of polypropylene and polypropylene compositions is determined according to the method of standard ISO 1133:2011, at a temperature of 230° C. and under a load of 2.16 kg.

The molecular weight Mn (number average molecular weight), Mw (weight average molecular weight), Mz (z average molecular weight) and molecular weight distribution D (Mw/Mn) and D' (Mz/Mw) are determined by size exclusion chromatography (SEC) and in particular by gel permeation chromatography (GPC). Briefly, a GPC-IR5 from Polymer Char was used: 10 mg polypropylene sample is dissolved at 160° C. in 10 mL of trichlorobenzene (technical grade) for 1 hour. Analytical conditions for the GPC-IR from Polymer Char are:

Injection volume: +/−0.4 mL;
Automatic sample preparation and injector temperature: 160° C.;
Column temperature: 145° C.;
Detector temperature: 160° C.;
Column set: 2 Shodex AT-806MS and 1 Styragel HT6E;
Flow rate: 1 mL/min;
Detector: IR5 Infrared detector (2800-3000 cm$^{-1}$);
Calibration: Narrow standards of polystyrene (commercially available);
Calculation for polypropylene: Based on Mark-Houwink relation ($\log_{10}$ ($M_{PP}$)=0.965909×$\log_{10}$ ($M_{PS}$)−0.28264); cut off on the low molecular weight end at $M_{PE}$=1000;

The molecular weight averages used in establishing molecular weight/property relationships are the number average ($M_n$), weight average ($M_w$) and z average ($M_z$) molecular weight.

These averages are defined by the following expressions and are determined from the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i M_i} = \frac{\sum_i h_i M_i}{\sum_i M_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and W are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

The molecular weight distribution (MWD) is then calculated as Mw/Mn.

The comonomer content of a polypropylene is determined by $^{13}$C-NMR analysis of pellets according to the method described by G. J. Ray et al. in Macromolecules, vol. 10, n° 4, 1977, p. 773-778.

The $^{13}$C-NMR analysis is performed using a 400 MHz or 500 MHz Bruker NMR spectrometer under conditions such that the signal intensity in the spectrum is directly proportional to the total number of contributing carbon atoms in the sample. Such conditions are well known to the person skilled in the art and include, for example, sufficient relaxation time, etc. In practice, the intensity of a signal is obtained from its integral, i.e., the corresponding area. The data is acquired using proton decoupling, 2000 to 4000 scans per spectrum with 10 mm at room temperature through or 240 scans per spectrum with a 10 mm cryoprobe, a pulse repetition delay of 11 seconds and a spectral width of 25000 Hz (+/−3000 Hz). The sample is prepared by dissolving a sufficient amount of polymer in 1,2,4-trichlorobenzene (TCB, 99%, spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+%), with HMDS serving as internal standard. To give an example, about 200 mg to 600 mg of polymer is dissolved in 2.0 mL of TCB, followed by the addition of 0.5 mL of $C_6D_6$ and 2 to 3 drops of HMDS.

Following data acquisition, the chemical shifts are referenced to the signal of the internal standard HMDS, which is assigned a value of 2.03 ppm.

The tensile modulus, the yield strength and the elongation at yield were determined according to ISO 527-1: 2019.

Haze properties were all measured according to ASTM D-1003-00 at 1 mm thickness.

The yellow index is measured by ASTM YI E313-00.

The following non-limiting examples illustrate the disclosure.

EXAMPLES

The advantages of the inventive polypropylene-based compositions are shown in the following examples.

Example 1—Selection of the Materials

The following materials were selected to perform the process under the disclosure.

Component A: The following polypropylene homopolymer resins commercially available at TotalEnergies were used as component A
PPH 5060
PPH 7042
PPH 7060
PPH 7089
PPH12020

Component B: Z9450 was used as component B. Z9450 is a polypropylene random copolymer commercially available at TotalEnergies. Z9450 has a melt flow (D-1238 at 230° C. under a load of 2.16 kg) of 5 g/10 min and an ethylene content of 7 wt. % as determined by NMR.

Component C: dibenzylidene sorbitol (DBS) was used as clarifying agent when present unless specified otherwise.

Component D: 2,5-dimethyl-2,5-bis(tert-butyl-peroxy) hexane (DHBP). commercially available as Trigonox 101 was used as visbreaking agent when present.

Component F: Calcium stearate and/or Mg—Al Hydrotalcite were used as neutralizing agents.

Component G: Glycerol monostearate (GMS) was used as antistatic agent.

Control Random Copolymer Polypropylene

The following random copolymer polypropylene were used as control:
PPR7220 is a polypropylene random copolymer commercially available at TotalEnergies.
PPR9220 is a polypropylene random copolymer commercially available at TotalEnergies.

Example 2—the Compositions

Different compositions were prepared by melt-blending.

The compositions were compounded on a twin-screw extruder corotating Coperion® ZSK 26 Mc[18], in following conditions:
screw diameter: 25.7 mm
screw length/diameter ratio=52
imposed temperature profile along the screw (in ° C.): 200° C. (this last temperature is the one imposed at the die)
screw speed: 250 rpm
output: 25 kg/h The compositions rheological measurements were performed at 230° C.

The technical data of the twin-screw extruder corotating Coperion® ZSK 26 Mc[18] are:
maximal torque per shaft: 140 Nm
maximal screw speed: 1200 min$^{-1}$
motor power: 37 kW The below table 1 provides the characteristics of the inventive and comparative examples as well as reference examples for compositions with a targeted $MI_2$ ranging from 8 to 13 g/10 min, wherein:
CE1 is an example providing the properties of the starting material PPH7060.
RE1 corresponds to the control polymer PPR7220 that has been clarified.
RE2 corresponds to the control polymer PPR7220 that has been clarified and for which the $MI_2$ has been adjusted.
IE1 is a composition comprising a blend 50/50 of PPH7060 and Z9450 that has been clarified using 2200 ppm of DBS.
IE2 is a composition comprising a blend 50/50 of PPH5060 and Z9450 that has been clarified using 2060 ppm of DBS and for which the $MI_2$ has been adjusted.
IE3 is a composition comprising a blend 60/40 of PPH5060 and Z9450 that has been clarified with 1500 ppm of DBS and for which the $MI_2$ has been adjusted.
IE4 is a composition comprising a blend 40/60 of PPH7060 and Z9450 that has been clarified with 1000 ppm of DBS and for which the $MI_2$ has been adjusted.
IE5 is a composition comprising a blend 50/50 of PPH7060 and Z9450 that was not clarified; it shows the desired balance of mechanical properties. As it can be seen, the optical properties are improved by comparison to CE1.

CE3 is a comparative example providing the properties of the starting material PPH7042 that was clarified with 500 ppm of DBS CE4 is a comparative composition comprising a blend 50/50 of PPH12020 and PPR3221 that was clarified. with 1100 ppm of DBS and 700 ppm of Na11.

CE5 is a comparative composition comprising a blend 70/30 of PPH7060 and Z9450 that was clarified with 2200 ppm of DBS.

The below table 3 provides the characteristics of the inventive and comparative examples as well as a reference example for compositions with a targeted $MI_2$ ranging from 19 to 21 g/10 min, wherein:

CE6 is a comparative example providing the properties of the starting material PPH9020 that has been clarified using 2180 ppm of DBS RE3 corresponds to the control polymer PPR9220 that has been clarified using 2160 ppm of DBS.

IE7 is an inventive composition comprising a blend 50/50 of PPH7060 and Z9450 that has been clarified using 2200 ppm of DBS and for which the $MI_2$ has been adjusted.

IE8 is an inventive composition comprising a blend 50/50 of PPH7089 and Z9450 that has been clarified using 2200 ppm of DBS and for which the $MI_2$ has been adjusted.

IE9 is an inventive composition comprising a blend 50/50 of PPH5060 and Z9450 that has been clarified with 2200 ppm of DBS and for which the $MI_2$ has been adjusted.

CE7 is a comparative composition comprising a blend 58/42 of PPH7060 and PPR10232 that has been clarified with 800 ppm of DBS.

All the inventive compositions have a yellow index below 10.

From the results and as illustrated by the target diagram of FIGS. 1 to 4, it can be seen that the inventive compositions show the desired balance of properties of tensile modulus, elongation at yield and a yield strength, allowing them to be used in the targeted applications, such as in caps and closures applications.

Figure 1:
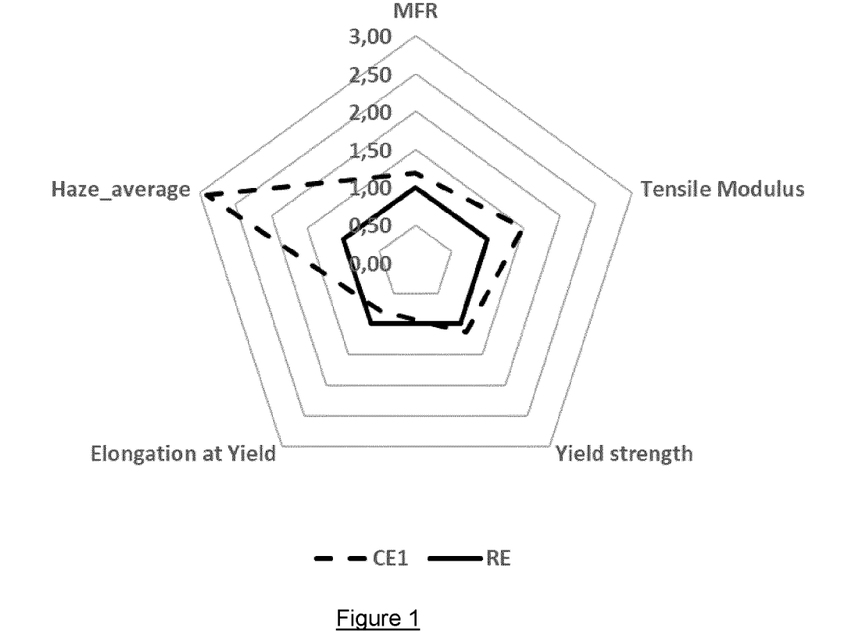
FIG. 1 is a target diagram showing the balance of properties of examples RE and CE1 respectively.
Figure 2:
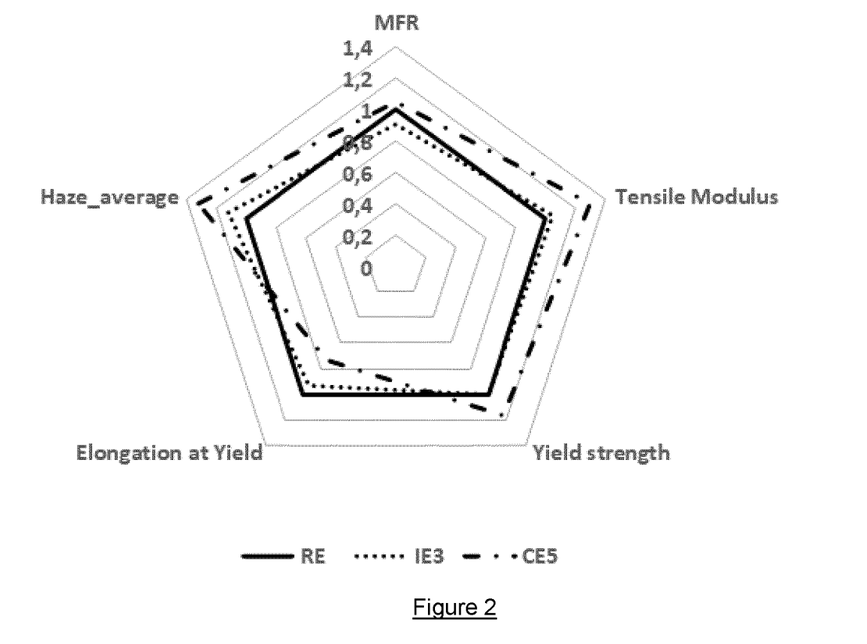
FIG. 2 is a target diagram showing the balance of properties of examples RE, IE3 and CE5 respectively.
Figure 3:
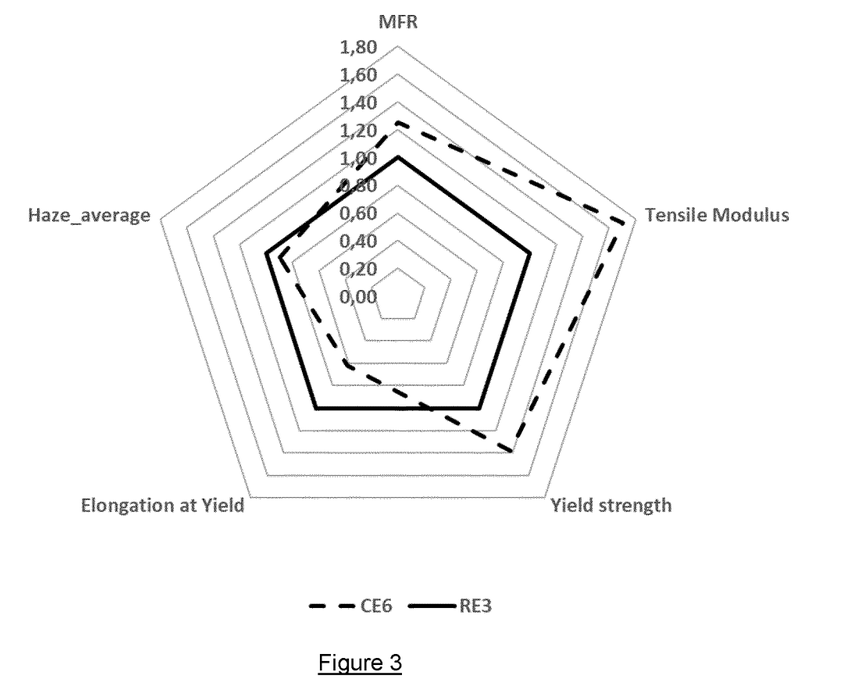
FIG. 3 is a target diagram showing the balance of properties of examples RE3 and CE6 respectively.
Figure 4:
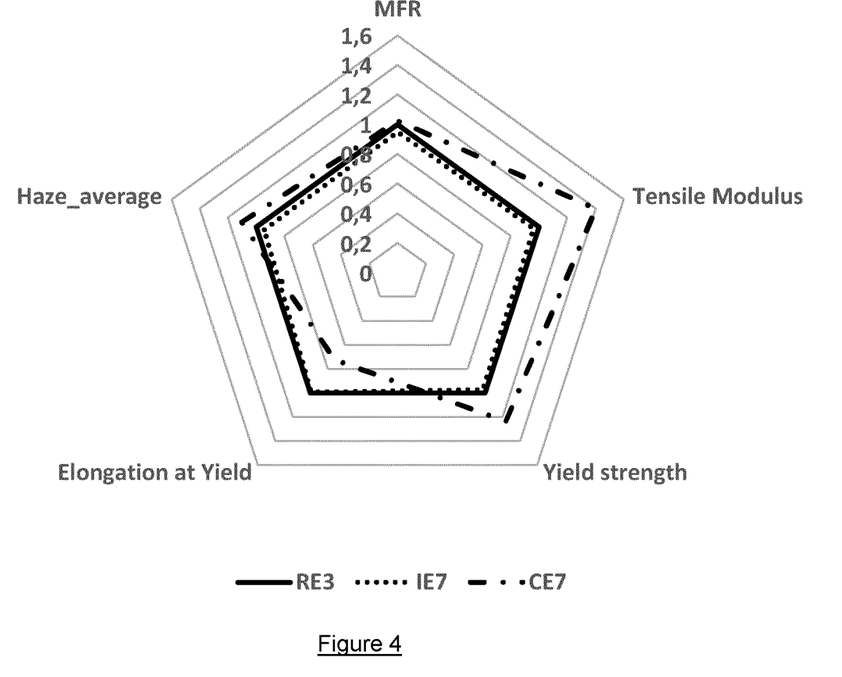
FIG. 4 is a target diagram showing the balance of properties of examples RE3, IE7 and CE7 respectively.

For the compositions of table 1, the target diagram is made from relative values based on a reference example RE that is representing the average values obtained for the control polymer PPR7220 as reported in RE1 and RE2. The values used for the reference date RE are provided in the below table 2.

TABLE 2

|  | RE1 | RE2 | RE |
|---|---|---|---|
| MFR | 11.1 | 12.0 | 11.6 |
| Tensile Modulus | 1027 | 1062 | 1044.5 |
| Yield strength | 28.2 | 28.2 | 28.2 |
| Elongation at Yield | 12.5 | 12.8 | 12.7 |
| Haze_average | 18.4 | 18.1 | 18.3 |

The relative data are provided in table 4. RE values are the basis of the comparison and are equal to 1. The relative values are then reported in FIGS. 1 and 2. For example, FIG. 2 shows that IE3 has an improved balance of properties including haze properties that is comparable to RE1, whereas this balance of properties is not achieved by CE5.

For example, the relative value of tensile modulus of 1.48 for CE1 that is given in table 4 is obtained with the following calculation:

$$TensModCE1/TensMod\ RE = 1550/1044.5 = 1.48$$

For the compositions of table 3, the relative data are provided in table 5. The improvement in the balance properties can be seen on FIG. 4, wherein IE7 is a composition comprising 50 wt. % of a homopolymer resin but shows the same balance of properties than the reference resin RE3. By contrast the targeted balance of properties is not achieved by CE7.

TABLE 1

| compositions with targeted $MI_2$ ranging from 8 to 13 g/10 min |  |  |  |  |  |  |  |  |  |  |  |  |
|---|---|---|---|---|---|---|---|---|---|---|---|---|
|  |  | CE1 | RE1 | RE2 | IE1 | IE2 | IE3 | IE4 | IE5 | CE3 | CE4 | CE5 |
| C2 content [1] | wt. % | 0 | 3.4 | 3.1 | 3.50 | 3.50 | 2.8 | 4.2 | 3.50 | 0 | 2 | 2.1 |
| CaSt | ppm | 400 | 300 | 380 | 200 | 200 | 0 | 0 | 200 | 0 | 450 | 200 |
| Mg—Al Hydrotalcite [3] | ppm | 0 | 0 | 0 | 0 | 0 | 0 | 0 | 0 | 400 | 500 | 0 |
| GMS | ppm | 0 | 800 | 760 | 800 | 800 | 0 | 0 | 800 | 2000 | 500 | 800 |
| Clarifyer |  | no | yes | yes | yes | yes | yes | yes | no | yes | yes | yes |
| Clarifyer | ppm | 0 | 2200 | 2060 | 2200 | 2200 | 1500 | 1000 | 0 | 500 | 1100/700 | 2200 |
| Calc. $MI_2$ [2] |  | — | — | — | 7.8 | 5.5 | 5.6 | 7.1 | 7.8 | — | 11.8 | 7.8 |
| $MI_2$ adjustment |  | no | no | yes | no | yes | yes | yes | no | no | no | yes |
| Triganox 101 | ppm |  |  |  |  | 150 | 110 | 80 |  |  |  | 80 |
| $MI_2$ | g/10 min | 13.7 | 11.1 | 12.0 | 8.0 | 12.8 | 10.5 | 11.2 | 7.0 | 12 | 11.5 | 12.1 |
| Tensile Modulus | MPa | 1550 | 1027 | 1062 | 977 | 934 | 1098 | 891 | 887 | 1641 | 1382 | 1355 |
| Yield strength | MPa | 32 | 28.2 | 28.2 | 26.7 | 25.6 | 28.2 | 25.2 | 25.2 | 38.1 | 32.8 | 32.8 |
| Elongation at Yield |  | 10 | 12.5 | 12.8 | 12.8 | 13.6 | 11.8 | 14.2 | 13.2 | 8.2 | 9.4 | 9.3 |
| Haze_average | % | 53 | 18.4 | 18.1 | 20.3 | 19.8 | 20.4 | 20 | 38.5 | not measured | 20 | 24 |

[1] for the blends the C2 content is calculated from the C2 content of the components of the blend.
[2] $MI_2$ of the compositions are estimated using a log composition law: Log ($MI_2$ final) = x Log ($MI_2$ PPH) + (1 − x) Log ($MI_2$ PPR) with x being comprised between 0 and 1.
[3] available under the commercial denomination DHT-4A from KISUMA CHEMICALS BV.

TABLE 3 compositions with targeted MI₂ ranging from 19 to 21 g/10 min

|  |  | CE6 | RE3 | IE7 | IE8 | IE9 | CE7 |
|---|---|---|---|---|---|---|---|
| C2 content [1] |  | 0 | 3.6 | 3.50 | 3.50 | 3.50 | 1.6 |
| CaSt | ppm | 890 | 380 | 200 | 200 | 200 | 0 |
| GMS | ppm | 1000 | 760 | 800 | 800 | 800 | 1050 |
| Clarifier |  | yes | yes | yes | yes | yes | yes |
| Clarifier | ppm | 2180 | 2060 | 2200 | 2200 | 2200 | 800 |
| Calc. MI₂ [2] |  | — | — | 7.8 | 7.8 | 5.5 | 19.9 |
| MI₂ adjustment |  | yes | yes | yes | yes | yes | no |
| Triganox 101 | ppm |  |  | 150 | 150 | 300 |  |
| MI₂ | g/10 min | 25 | 20.0 | 19.0 | 20.0 | 19.0 | 20.5 |
| Tensile Modulus | MPa | 1700 | 999 | 960 | 952 | 958 | 1400 |
| Yield strength | MPa | 37 | 26.8 | 26.1 | 25.8 | 25.9 | 33.1 |
| Elongation at Yield | % | 8 | 12.9 | 12.8 | 12.9 | 13 | 9.3 |
| Haze_average | % | 18 | 20.1 | 19 | 24.1 | 21.7 | 22.2 |

[1] for the blends the C2 content is calculated from the C2 content of the components of the blend.
[2] MI₂ of the compositions are estimated using a log composition law: Log (MI₂ final) = x Log (MI₂ PPH) + (1 − x) Log (MI₂ PPR) with x being comprised between 0 and 1.

TABLE 4 relative values of mechanical and optical properties of the compositions of table 1.

|  | CE1 | RE | IE1 | IE2 | IE3 | IE4 | IE5 | CE3 | CE4 | CE5 |
|---|---|---|---|---|---|---|---|---|---|---|
| MFR | 1.19 | 1 | 0.69 | 1.11 | 0.91 | 0.97 | 0.61 | 1.04 | 1.00 | 1.05 |
| Tensile Modulus | 1.48 | 1 | 0.94 | 0.89 | 1.05 | 0.85 | 0.85 | 1.57 | 1.32 | 1.30 |
| Yield strength | 1.13 | 1 | 0.95 | 0.91 | 1.00 | 0.89 | 0.89 | 1.35 | 1.16 | 1.16 |
| Elongation at Yield | 0.79 | 1 | 1.01 | 1.08 | 0.93 | 1.12 | 1.04 | 0.65 | 0.74 | 0.74 |
| Haze_average | 2.90 | 1 | 1.11 | 1.08 | 1.12 | 1.10 | 2.11 | — | 1.10 | 1.32 |

TABLE 5 relative values of mechanical and optical properties of the compositions of table 3.

|  | CE6 | RE3 | IE7 | IE8 | IE9 | CE7 |
|---|---|---|---|---|---|---|
| MFR | 1.25 | 1 | 0.95 | 1.00 | 0.95 | 1.03 |
| Tensile Modulus | 1.70 | 1 | 0.96 | 0.95 | 0.96 | 1.40 |
| Yield strength | 1.38 | 1 | 0.97 | 0.96 | 0.97 | 1.24 |
| Elongation at Yield | 0.62 | 1 | 0.99 | 1.00 | 1.01 | 0.72 |
| Haze_average | 0.90 | 1 | 0.95 | 1.20 | 1.08 | 1.10 |

The invention claimed is:

1. Process to produce a polypropylene composition characterized in that it comprises the steps of:
providing from 30 to 75 wt. % of a component A based on the total weight of the polypropylene composition, wherein the component A is selected from one or more propylene homopolymer resins, one or more random propylene copolymer resins comprising propylene and one or more comonomers selected from ethylene and $C_4$-$C_{20}$ alpha-olefin; wherein the content of the one or more comonomers is at most 1.0 wt. % based on the total weight of the random propylene copolymer resins, and any mixture thereof; and wherein the component A has a melt index ($MI_2$) ranging from 2.0 to 100.0 g/10 min as determined according to ISO 1133-1:2011 at a temperature of 230° C. and under a load of 2.16 kg;
providing from 25 to 70 wt. % of a component B based on the total weight of the polypropylene composition, the component B being one or more random propylene copolymer resins comprising propylene and one or more comonomers selected from ethylene and $C_4$-$C_{20}$ alpha-olefin; wherein the content of the one or more comonomers of the component B is at least 5.0 wt. % based on the total weight of the component B; and
melt-blending the components to form a polypropylene composition having a comonomer content ranging from 2.5 to 4.5 wt. % based on the total weight of the polypropylene composition.

2. The process according to claim 1, characterized in that the component A is selected from one or more virgin propylene polymer resins; one or more polypropylene post-consumer resins; one or more polypropylene post-industrial resins (PIR-PP); and any mixture thereof.

3. The process according to claim 1, wherein the component A has a melt index ($MI_2$) ranging from 2.5 to 40.0 g/10 min as determined according to ISO 1133-1:2011 at a temperature of 230° C. and under a load of 2.16 kg; and/or in that the content of the component A is at least 40 wt. % based on the total weight of the polypropylene composition.

4. The process according to claim 1, wherein the component B is one or more random propylene copolymer resins comprising propylene and ethylene and/or has content of comonomer ranging from 6.0 to 25.0 wt. % based on the total weight of the component B.

5. The process according to claim 1, wherein the component B has a melt index ($MI_2$) ranging from 1.0 to 50.0 g/10 min as determined according to ISO 1133-1:2011 at a temperature of 230° C. and under a load of 2.16 kg.

6. The process according to claim 1, wherein it further comprises the step of providing a component C being one or more nucleating agents and/or one or more clarifying agents and in that the step of melt-blending the components to form a polypropylene composition comprises melt-blending the component C with the other components; with preference, the component C is or comprises one or more clarifying agents selected from sorbitol acetals, dibenzylidene nonitol, non-sorbitol, trisamide, phosphate ester salts and any mixture thereof.

7. The process according to claim 1, wherein it further comprises the step of providing a component D being one or more visbreaking agents and in that the step of melt-blending the components to form a polypropylene composition comprises melt-blending the component D with the other components; with preference, the component D is selected from 2,5-dimethyl-2,5-bis (tert-butyl-peroxy) hexane, 2,5-dimethyl-2,5-bis (tert-butyl-peroxy) hexyne-3, dicumyl-peroxide, di-tert-butyl-peroxide, tert-butylcumyl-peroxide, bis (tert-butylperoxy-isopropyl) benzene, 3,6,9-triethyl-3,6,9-trimethyl-1,4,7-triperoxonane, 1,2,4,5,7,8-Hexoxonane, 3,6,9-trimethyl-, 3,6,9-tris (Ethyl and Propyl) derivatives, and any mixture thereof.

8. The process according to claim 1, wherein it further comprises the step of providing from 10 to 30 wt. % of a component E being a viscosity modulator, wherein the component E is selected from one or more propylene homopolymer resins and/or one or more random propylene copolymers, and in that the step of melt-blending the components to form a polypropylene composition comprises melt-blending the component E with the other components; with preference, the component E has a melt index ($MI_2$) ranging from 0.1 to 200.0 g/10 min as determined according to ISO 1133-1:2011 at a temperature of 230° C. and under a load of 2.16 kg.

9. A polypropylene composition characterized in that it comprises:
   30 to 75 wt. % of a component A based on the total weight of the polypropylene composition, wherein the component A is selected from one or more propylene homopolymer resins, one or more random propylene copolymer resins comprising propylene and one or more comonomers selected from ethylene and $C_4$-$C_{20}$ alpha-olefin; wherein the content of the one or more comonomers is at most 1.0 wt. % based on the total weight of the random propylene copolymer resins, and any mixture thereof; and wherein the component A has a melt index ($MI_2$) ranging from 2.0 to 100.0 g/10 min as determined according to ISO 1133-1:2011 at a temperature of 230° C. and under a load of 2.16 kg; and
   25 to 70 wt. % of a component B based on the total weight of the polypropylene composition, the component B being one or more random propylene copolymer resins comprising propylene and one or more comonomers selected from ethylene and $C_4$-$C_{20}$ alpha-olefin; wherein the content of comonomer of the component B is at least 5.0 wt. % based on the total weight of the component B;
   wherein the polypropylene composition has a comonomer content ranging from 2.5 to 4.5 wt. % based on the total weight of the polypropylene composition; with preference, the polypropylene composition is produced by the process according to claim 1.

10. The polypropylene composition of claim 9 having a melt index ($MI_2$) ranging from 0.5 to 150.0 g/10 min as determined according to ISO 1133-1:2011 at a temperature of 230° C. and under a load of 2.16 kg.

11. The polypropylene composition according to claim 9, further comprising one or more selected from:
   a component C being one or more nucleating agents and/or one or more clarifying agents; and/or
   a component D being one or more visbreaking agents; and/or
   a component E being a viscosity modulator, wherein the component E is selected one or more propylene homopolymer resins and/or one or more random propylene copolymers.

12. The polypropylene composition according to claim 9, further showing a tensile modulus ranging from 750 to 1250 MPa as determined according to ISO 527-1: 2019; an elongation at yield ranging from 9.6 to 15.9% as determined according to ISO 527-1:2019 and a yield strength ranging from 20.8 to 34.7 MPa as determined according to ISO 527-1:2019; with preference, the polypropylene composition further has a yellow index of at most 10 as determined by ASTM YI E313-00.

13. The polypropylene composition according to claim 9, wherein the polypropylene composition further has a haze at 1 mm thickness of less than 30%, measured according to ASTM D-1003-00; with preference less than 25%.

14. The use of recycled polypropylene resins selected from one or more polypropylene post-consumer resins and/or one or more polypropylene post-industrial resins, wherein the recycled polypropylene resins are or comprise one or more propylene homopolymer resins, one or more random propylene copolymer resins comprising propylene and one or more comonomers selected from ethylene and $C_4$-$C_{20}$ alpha-olefin; wherein the content of the one or more comonomers is at most 1.0 wt. % based on the total weight of the random propylene copolymer resins, and any mixture thereof, and wherein the recycled polypropylene resins have a melt index ranging from 2.0 to 100.0 g/10 min as determined according to ISO 1133-1:2011 at a temperature of 230° C. and under a load of 2.16 kg, to produce a polypropylene composition according to claim 9.

15. An article made from the polypropylene composition according to claim 9, wherein the article is produced by extrusion or by injection molding.

* * * * *